(12) United States Patent
Tani et al.

(10) Patent No.: US 9,746,107 B2
(45) Date of Patent: Aug. 29, 2017

(54) DUCT

(75) Inventors: Naoto Tani, Nagoya (JP); Teruo Tamada, Yamato (JP); Kenji Iwasaki, Nagoya (JP)

(73) Assignee: KYORAKU CO., LTD., Kyoto (JP)

( * ) Notice: Subject to any disclaimer, the term of this patent is extended or adjusted under 35 U.S.C. 154(b) by 343 days.

(21) Appl. No.: 14/125,368

(22) PCT Filed: Jun. 22, 2012

(86) PCT No.: PCT/JP2012/066020
§ 371 (c)(1),
(2), (4) Date: Dec. 11, 2013

(87) PCT Pub. No.: WO2013/002145
PCT Pub. Date: Jan. 3, 2013

(65) Prior Publication Data
US 2014/0130933 A1 May 15, 2014

(30) Foreign Application Priority Data

Jun. 28, 2011 (JP) ................................. 2011-142891
Jun. 28, 2011 (JP) ................................. 2011-142899
Jun. 29, 2011 (JP) ................................. 2011-144721

(51) Int. Cl.
*F16L 9/00* (2006.01)
*F24F 13/02* (2006.01)
*B60H 1/00* (2006.01)
*F16L 9/127* (2006.01)

(52) U.S. Cl.
CPC .......... *F16L 9/006* (2013.01); *B60H 1/00564* (2013.01); *F16L 9/127* (2013.01); *F24F 13/02* (2013.01); *F24F 13/0209* (2013.01); *F24F 13/0245* (2013.01)

(58) Field of Classification Search
CPC ... F16L 9/006; F16L 9/127; F24F 13/02; B60H 1/00564
USPC ......................................... 138/156, 170, 171
See application file for complete search history.

(56) References Cited

U.S. PATENT DOCUMENTS 1,930,285 A * 10/1933 Robinson ................... B64C 3/00
114/79 W
2,817,264 A * 12/1957 Pearson ............ G01N 27/44721
204/600
3,970,113 A * 7/1976 Guttinger ............ B29C 47/0847
138/157
(Continued)

FOREIGN PATENT DOCUMENTS

JP 5-40751 6/1993
JP 5-87387 11/1993
(Continued)

OTHER PUBLICATIONS
Machine Translation of JP2001-213137.*
(Continued)

*Primary Examiner* — Vishal Pancholi
(74) *Attorney, Agent, or Firm* — Maier & Maier, PLLC

(57) ABSTRACT

A duct in which the welding strength of the parting lines is enhanced and which facilitates the attaching job is provided. The duct of the present embodying mode has a mean thickness of the entire duct of 1 mm or less, and includes projections on inner surface sides of the duct on the parting lines.

5 Claims, 23 Drawing Sheets

(56) References Cited

U.S. PATENT DOCUMENTS

| | | | |
|---|---|---|---|
| 6,842,957 B2* | 1/2005 | Van Giezen | B21C 37/06 138/171 |
| 8,448,671 B2* | 5/2013 | Onodera | B60H 1/00564 138/137 |
| 2001/0018104 A1* | 8/2001 | Iwasaki | B29C 49/4802 428/36.9 |
| 2012/0061886 A1* | 3/2012 | Sumi | B29C 51/00 264/571 |

FOREIGN PATENT DOCUMENTS

| | | |
|---|---|---|
| JP | 6-6027 | 1/1994 |
| JP | 2001-213137 | 8/2001 |
| JP | 2002-79569 | 3/2002 |
| JP | 2005-241157 | 9/2005 |
| JP | 2009-293535 | 12/2009 |

OTHER PUBLICATIONS

Japan Office action, dated Nov. 25, 2014 along with a partial English language translation thereof.
International Search Report, mail date is Sep. 4, 2012.

* cited by examiner (a)  (b)

FIG. 8
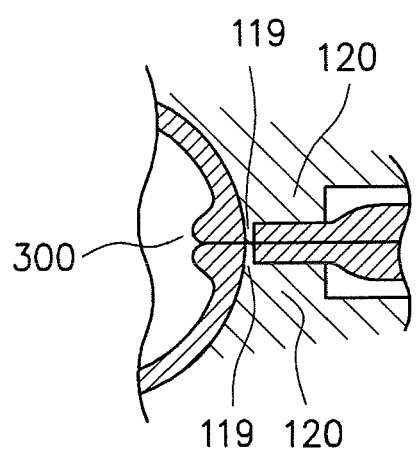
(a)
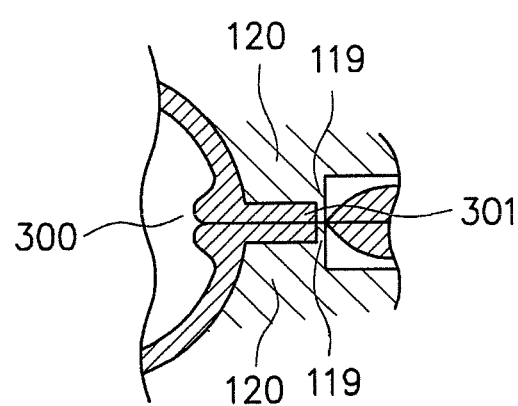
(b)
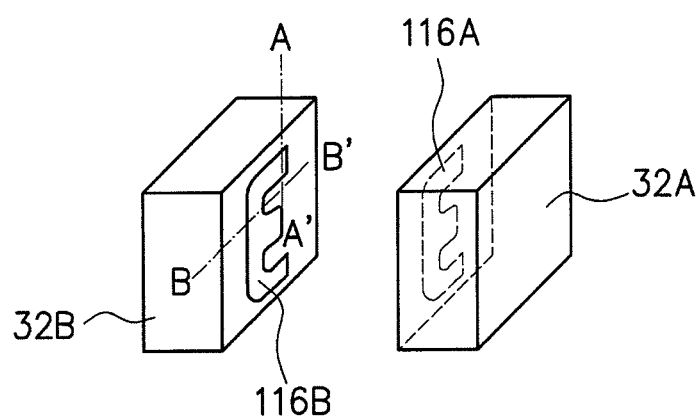
(c)

FIG. 12
(a)
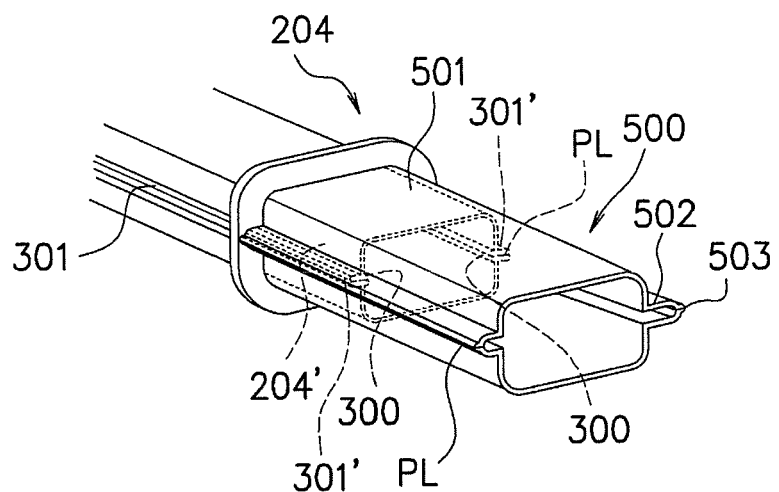
(b)
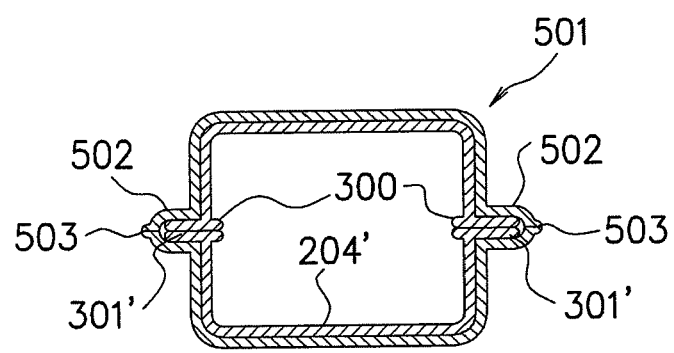

FIG. 19
(a)
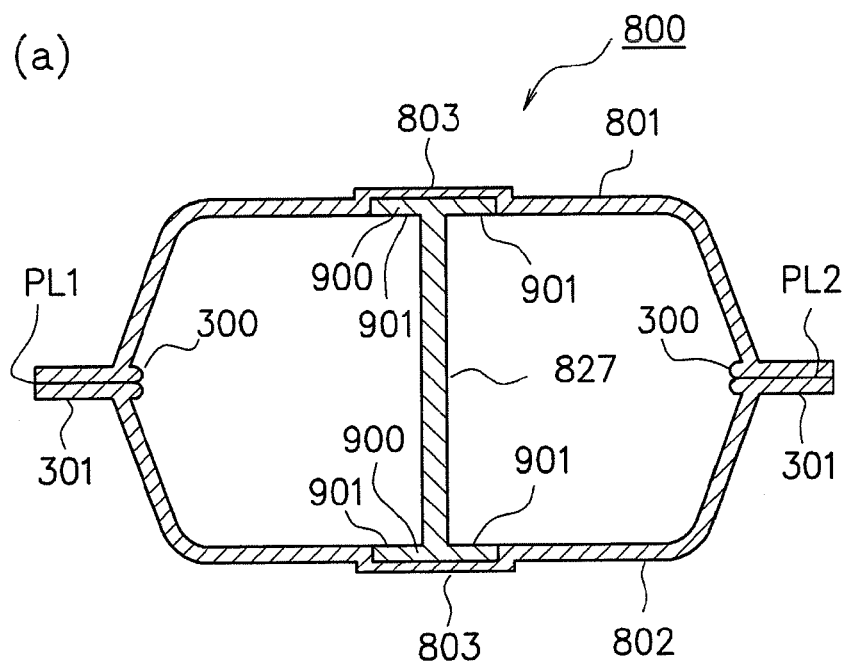
(b)
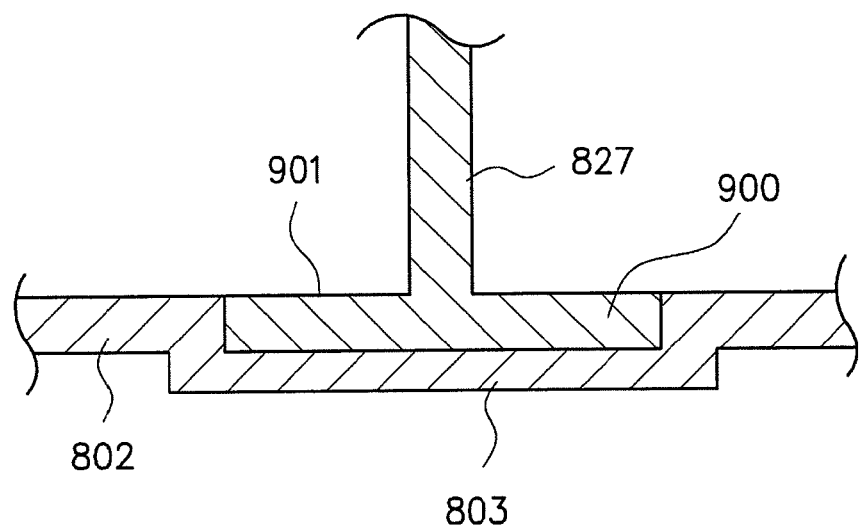

FIG. 20
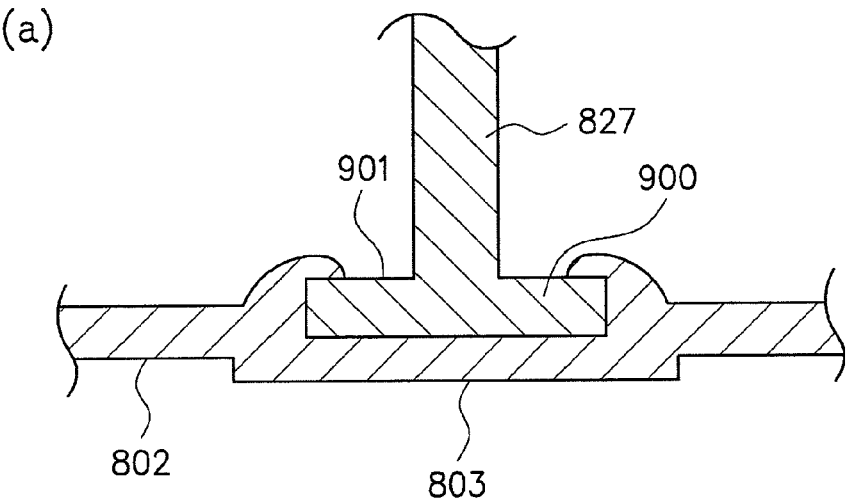
(a)
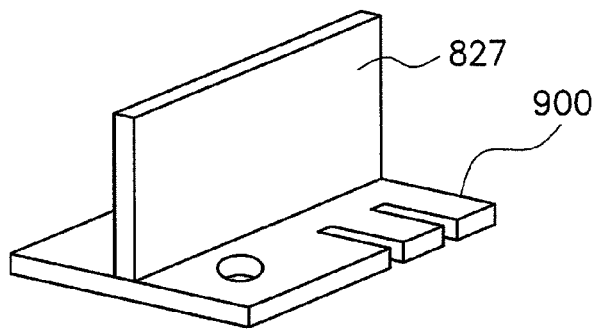
(b)
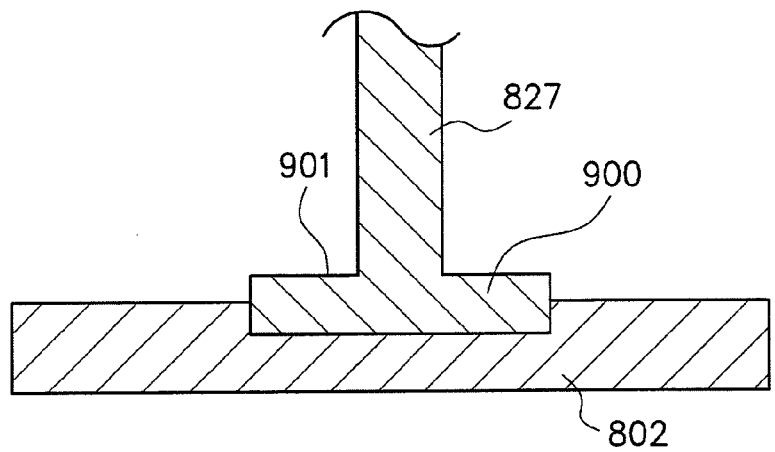
(c)

DUCT

TECHNICAL FIELD

The present invention relates to a duct.

BACKGROUND ART

Recently, to lower the cost and weight, a thin duct (the mean thickness is 1 mm or less) has been desired.

However, in a situation where a thin duct is molded by use of a sheet of thermoplastic resin in a melted state, since the sheet is thin, the sheet is quickly cooled and the welding strength of the parting line is lowered. Also, when the sheet is thin, the welding area of the parting line is small; hence, the welding strength of the parting line is lowered.

When the welding strength of the parting line is lowered, a crack easily takes place beginning at the parting line, and the welded sheets easily peel off from each other. Hence, when molding a thin duct, it is required to increase the welding strength of the parting line.

Incidentally, as technical literature filed prior to the present invention, there is literature (for example, patent document 1: Utility Model Laid-Open Ser. No. 5-87387) disclosing a technique to increase strength of a crashed section which is formed by crashing resin by metallic molds from the right and left sides along a parting line.

PRIOR ART REFERENCE

Patent Document

Patent Document 1: Utility Model Laid-Open Ser. No. 5-87387

SUMMARY OF THE INVENTION

Problems to be Solved by the Invention

In patent document 1, a long rib is formed along the overall length of the crashed section along the parting line of the duct, to increase strength of the crashed section along the parting line of the duct.

However, as in patent document 1, when a long rib is formed along the overall length of the crashed section, the rib projecting from the body of the duct toward the outside easily interferes with other members, and the duct attaching job is difficult depending on cases.

The present invention has been made in consideration of the situation above and aims at providing a duct in which the welding strength of the parting line is increased and which facilitates the attaching job.

Means for Solving to the Problems

To achieve the object, the present invention has the following aspect.

The duct in accordance with the present invention is a resin duct comprising a first wall section and a second wall section welded via parting lines, characterized in that: a mean thickness of the entire duct is 1 mm or less, and the duct comprises projections formed by projecting the resin on inner surface sides of the duct on the parting lines.

Advantageous Effects of the Invention

In accordance with the present invention, it is possible to provide a duct in which the welding strength of the parting lines is increased and which facilitates the attaching job.

BRIEF DESCRIPTION OF THE DRAWINGS

FIG. 8 is a diagram showing a configuration example of two-stage pinch-off sections of pinch-off sections 118 of the split molds 32.

FIG. 12 is a diagram showing a state in which another member 500 is connected to the connecting section 204'.

FIG. 19 is a diagram showing a cross-sectional configuration example of the defroster duct 800 shown in FIG. 18.

FIG. 20 is a diagram showing a configuration example of a fillet 827 disposed in the defroster duct 800.

DESCRIPTION OF THE EMBODIMENTS

Outline of Duct 200 in Accordance with Present Invention

Figure 1:
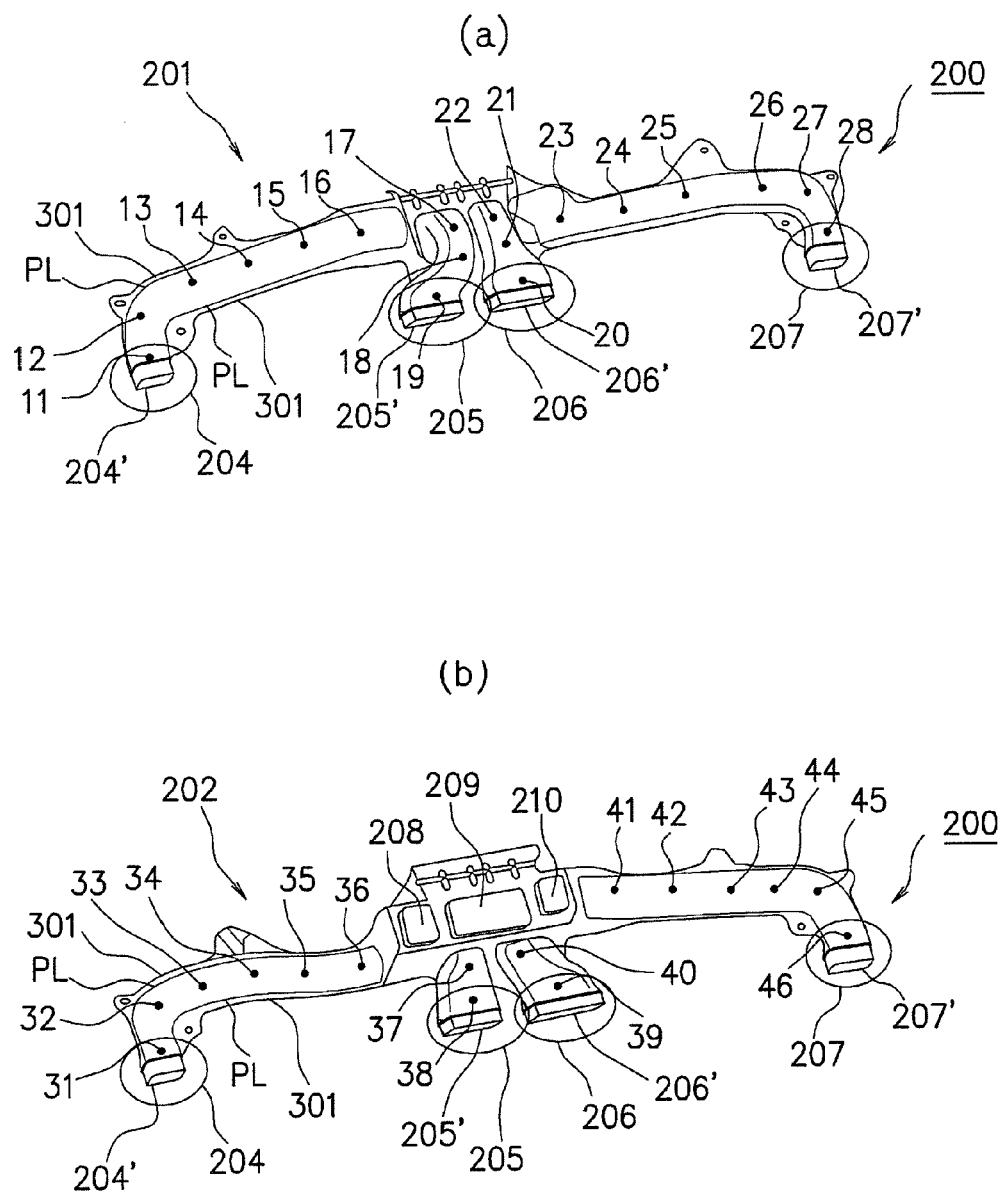
FIG. 1 is a diagram showing a configuration example of an in-panel duct 200 of the present embodying mode.
Figure 2:
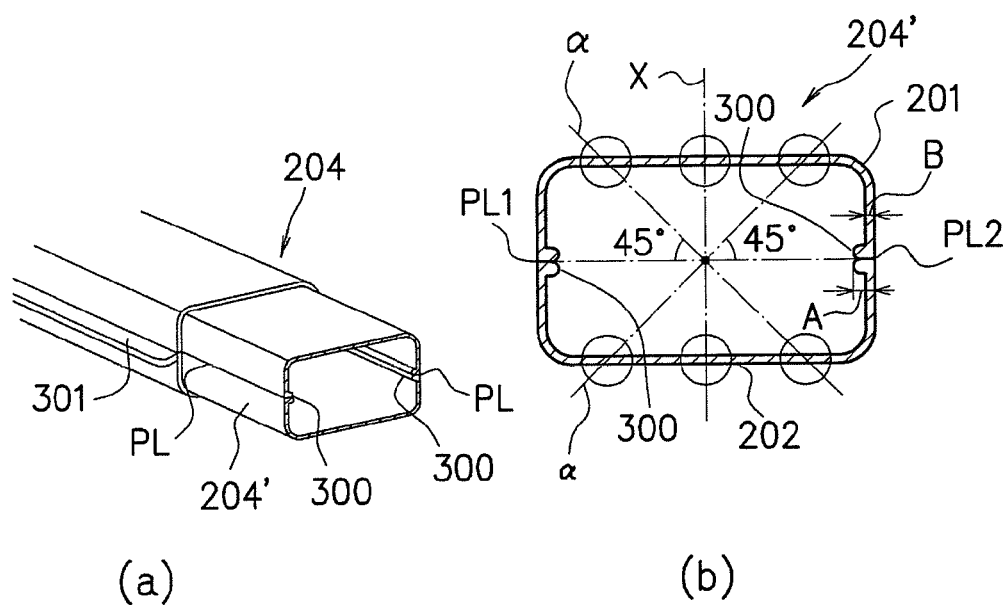
FIG. 2 is a diagram showing a magnified configuration example (a) of a periphery of a connecting section 204' disposed in an opening 204 of the in-panel duct 200 shown in FIG. 1 and a cross-sectional configuration example (b) vertical to the hollow extending direction of the connecting section 204'.

First, by referring to FIGS. 1 and 2, description will be given of the duct 200 in accordance with the present invention. FIG. 1 is a diagram showing a configuration example of one embodying mode of the duct 200 in accordance with the present invention, and FIG. 1 (a) shows the side of a first wall section 201 of the duct 200 and FIG. 1 (b) shows the side of a second wall section 202 of the duct 200. FIG. 2 is a diagram showing a configuration example of the inner surface side of the duct 200.

The duct 200 in accordance with the present invention is, as shown in FIGS. 1 and 2, a resin duct 200 including a first wall section 201 and a second wall section 202 to be welded via parting lines PL.

The duct 200 in accordance with the present invention has a mean thickness of 1 mm or less in the overall duct and includes, as shown in FIG. 2, on an inner surface side of the duct on the parting lines PL, projections 300 formed by projecting resin configuring the duct 200.

Since the duct 200 in accordance with the present invention includes the projections 300 on the duct inner surface side on the parting lines PL, it is possible to provide a duct 200 in which the welding strength of the parting lines PL is increased and which facilitates the attaching job. Next, referring to the accompanying drawings, description will be given in detail of embodying modes of the duct 200 in accordance with the present invention. However, in conjunction with the embodying modes below, description will be given of examples of an in-panel duct or a defroster duct as an embodying mode of the duct 200.

(First Embodying Mode)
<Configuration Example of In-Panel Duct 200>

First, referring to FIGS. 1 and 2, description will be given of a configuration example of an in-panel duct 200 of the present embodying mode. FIG. 1 is a diagram showing a configuration example of the in-panel duct 200 of the present embodying mode, and FIG. 1 (a) shows the side of the first wall section 201 of the in-panel duct 200 and FIG. 1(b) shows the side of the second wall section 202 of the in-panel duct 200. FIG. 2 is a diagram showing a magnified configuration example (a) of a periphery of a connecting section 204' disposed in an opening 204 of the in-panel duct 200 shown in FIG. 1 and a cross-sectional configuration example (b) vertical to the hollow extending direction of the connecting section 204'.

The in-panel duct 200 of the present embodying mode is a resin duct and includes a first wall section 201 and a second wall section 202 welded via parting lines PL. Further, the in-panel duct 200 of the present embodying mode includes, as shown in FIG. 2 (a), projections 300 on a duct inner surface side on the parting lines PL and crashed sections 301 on a duct outer surface side.

The projections 300 are projected portions or the like formed, when molding the in-panel duct 200, by projecting (swelling) the resin toward the duct inner surface side.

The crashed sections 301 are flange sections or the like formed, when molding the in-panel duct 200, by crashing the resin by the split molds toward the duct outer surface side.

The in-panel duct 200 of the present embodying mode includes the projections 300 on the duct inner surface side on the parting lines PL and the crashed sections 301 on a duct outer surface side; hence, it is possible that the welding area of the parting lines PL is increased and the welding strength of the parting lines PL is enhanced.

The mean thickness of the first wall section 201 and the second wall section 202 configuring the in-panel duct 200 of the present embodying mode ranges from 0.3 mm to 1.0 mm, and the thickness difference between the mean thickness of the first wall section 201 and that of the second wall section 202 is 0.3 mm or less. Further, the variation factor in the thickness of the overall in-panel duct 200 is 0.3 or less. Since the in-panel duct 200 of the present embodying mode has the thickness difference equal to or less than 0.3 mm and the variation factor equal to or less than 0.3, thermal deformation (such as a warp) of the duct can be suppressed.

The mean thickness of the present embodying mode means the mean value of thickness measured at an equal interval of about 100 mm in the hollow extending direction of the resin molded product. For a hollow resin molded product, it means the mean value of thickness, the thickness being obtained by measuring thickness in each wall section of the first wall section 201 and the second wall section 202 to be welded via the parting lines PL, at positions in the 90° direction of each parting line PL. However, at the measuring positions, the crashed sections 301 and the projected sections 300 are not present.

The hollow extending direction is the direction in which the hollow section extends in the resin molded product and is the direction in which fluid such as air flows. The positions in the 90° direction of the parting line PL mean, as shown in FIG. 2 (b), in the cross section vertical to the hollow extending direction, the positions of intersection with a straight line X which passes through the central point of a line segment connecting one of the parting lines PL1 to the other one parting line PL2 and which perpendicularly intersects the line segment.

The means thickness on the first wall section 201 side of the in-panel duct 200 of the present embodying mode is the mean value of thickness measured at 18 positions 11 to 19 and 20 to 28 on the first wall section 201 side of the in-panel duct 200 shown in FIG. 1 (a). Also, the means thickness on the second wall section 202 side is the mean value of thickness measured at 16 positions 31 to 38 and 39 to 46 on the second wall section 202 side of the in-panel duct 200 shown in FIG. 1 (b). The mean thickness of the overall in-panel duct 200 is the mean thickness of the mean thickness on the first wall section 201 side and the means thickness on the second wall section 202 side.

The variation factor of thickness of the overall in-panel duct 200 indicates dispersion of thickness measured at an equal interval of about 100 mm in the hollow extending direction of the resin molded product and is the value obtained by dividing the standard deviation of thickness measured at respective parts of the resin molded product by the mean value of thickness of the respective parts (variation factor=standard deviation of thickness/mean value of thickness). Incidentally, the thickness measuring positions are in the 90° direction of the parting line PL.

The in-panel duct 200 of the present embodying mode includes a hollow section in the duct, to flow fluid such as air via the hollow section. 204 to 210 shown in FIG. 1 indicate openings; the fluid having passed through the in-panel duct 200 is fed via the openings.

Figure 3:
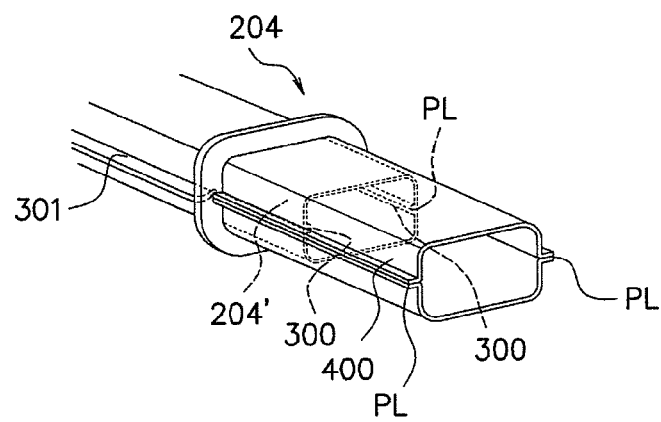
FIG. 3 is a diagram showing a state in which another member 400 is connected to the connecting section 204'.

The openings 204 to 207 of the in-panel duct 200 of the present embodying mode include connecting sections 204' to 207' to connect to other members (not shown), and crashed sections 301 are formed on the duct outer surface side on the parting line PL in other than the connecting section 204'. The connecting sections 204' to 207' of the present embodying mode are, as shown in FIG. 3, male-type connecting sections which are inserted in the inner surface side of other members 400 for the connection, and as shown in FIG. 2 (a), no crashed section 301 is formed on the duct outer surface side on the parting line PL of the connecting section 204', and the projections 300 are formed on the duct inner surface side. Incidentally, FIG. 3 shows a state in which the connecting section 204' is inserted in the inner surface side of the other member 400 and is connected thereto, and the other connecting sections 205' to 207' are also inserted, like the connecting section 204' shown in FIG. 3, in the inner surface side of the other members 400 and are connected thereto. Further, FIG. 2 (a) shows a configuration example of the periphery of the connecting section 204', and the other connecting sections 205' to 207' are also similarly configured as shown in FIG. 2 (a). The other members 400 are female-type members which connect to the connecting sections 205' to 207' to feed fluid and which may be, for example, an inlet and an outlet of a duct, fluid, or the like.

The in-panel duct 200 of the present embodying mode connects to the other members 400 as shown in FIG. 3; hence, when the crashed sections 301 are formed in the outer circumferences of the openings 204 to 207 of the in-panel duct 200, it easily interferes with the members in the periphery of the in-panel duct 200, and the attaching job of the in-panel duct 200 is difficult in some cases.

Hence, in the in-panel duct 200 of the present embodying mode, the projections 300 are formed in the inner circumferences of the openings 204 to 207. By forming the projections 300 in the inner circumferences of the openings 204 to 207, even when no crashed section 301 is formed in the outer circumferences of the openings 204 to 207 as shown in FIG. 2 (b), it is possible that the welding area of the parting lines PL of the openings 204 to 207 is increased and the welding strength of the parting lines PL is enhanced.

The welding area of the parting lines PL is an area in which the first wall section 201 and the second wall section 202 are welded onto each other, and indicates the sections of the parting lines PL1 and PL2 shown in FIG. 2 (b). The relationship between the mean thickness B in a predetermined cross section of the in-panel duct 200 and the thickness A of the section of the parting line PL in which the projections 300 are formed in the predetermined cross section is favorably thickness A=1.0 B to 2.0 B by using the thickness B as the reference. Thickness A=1.2 B to 1.8 B is more favorable.

As a result, it is possible to increase the welding strength of the parting lines PL and to avoid influences (reduction in the flow rate and the like) upon the fluid flowing through the duct. Incidentally, the mean thickness B in the predetermined cross section of the in-panel duct 200 is the mean value of thickness at six points on the predetermined cross section shown in FIG. 2 (b). The six points include two points of intersection with the line in the 90° direction (X direction) of the parting line PL and four points of intersection with an inclined line α which passes through the central point of the line segment connecting the parting lines PL1 to PL2 and which is inclined 45 degrees with respect to the line segment. In the present embodying mode, the mean thickness B in the predetermined cross section is the mean value of thickness obtained at the six points.

Also, the connecting sections 204' to 207' of the in-panel duct 200 of the present embodying mode are of the male type and are inserted in the inner surface side of other members 400 for the connection; hence, it is not possible to form any crashed section 301 in the outer circumferences of the connecting sections 204' to 207'. Hence, in the in-panel duct 200 of the present embodying mode, the projections 300 are formed in the inner circumferences of the connecting sections 204' to 207', to enhance the welding strength of the parting lines PL of the connecting sections 204' to 207'. As a result, cracks do not easily take place in the parting lines PL of the connecting sections 204' to 207'.

Incidentally, since the in-panel duct 200 of the present embodying mode is thin, it is favorable to form projections 300 also in locations other than the openings 204 to 207 and the connecting sections 204' to 207'. As a result, there exist locations in which the crashed section 301 is present on the duct outer surface side of the parting line PL and in which the projection 300 is present on the duct inner surface side of the parting line PL; hence, it is possible to further increase the welding strength of the parting lines PL and to enhance rigidity of the in-panel duct 200. Incidentally, the projections 300 and the crashed sections 301 are favorably formed in a range of 90% or more of the parting lines PL formed in the in-panel duct 200. As a result, at least either the projections 300 or the crashed sections 301 are formed on the parting lines PL formed on the overall circumference of the in-panel duct 200; hence, it is possible to increase the welding strength of the parting lines PL and to enhance rigidity of the in-panel duct 200.

<In-Panel Duct 200 Molding Method Example>

Figure 4:
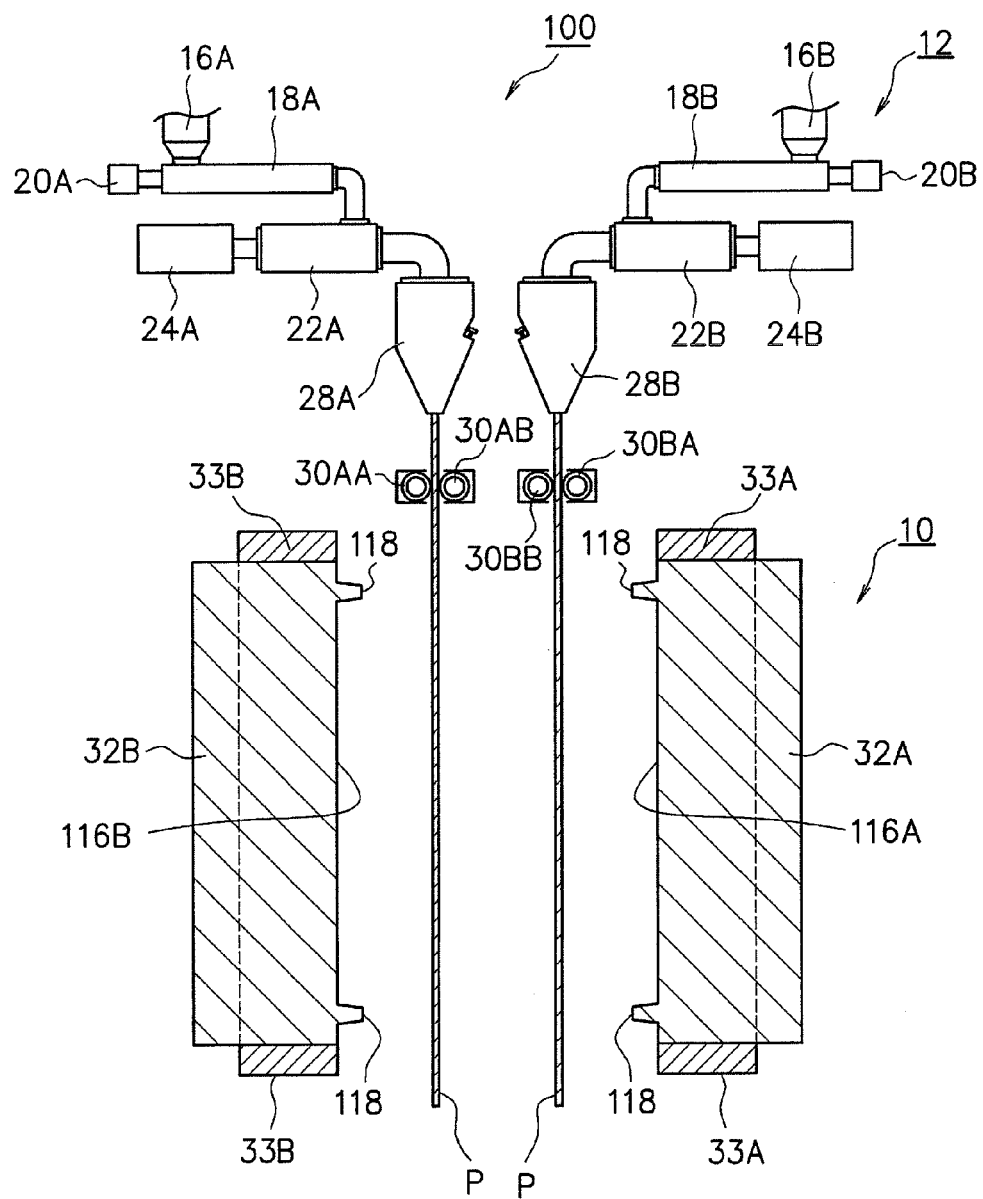
FIG. 4 is a diagram showing a configuration example of a molding device 100 to mold the in-panel duct 200 of the present embodying mode.

Next, referring to FIGS. 4 to 9, description will be given of a molding method example of the in-panel duct 200 of the present embodying mode. FIG. 4 shows a configuration example of a molding device 100 to mold the in-panel duct 200 of the present embodying mode, and FIGS. 4 to 9 show a molding process example to mold the in-panel duct 200 of the present embodying mode.

First, referring to FIG. 4, description will be given of a configuration example of the molding device 100 to mold the in-panel duct 200 of the present embodying mode.

The molding device 100 to mold the in-panel duct 200 of the present embodying mode includes an extruding machine 12 and a clamping machine 10, and a thermoplastic resin sheet P in a melted state is extruded from the extruding machine 12 to the clamping machine 10 such that the clamping machine 10 clamps the thermoplastic resin sheet P to mold the in-panel duct 200 shown in FIG. 1.

The extruding machine 12 includes a cylinder 18 equipped with a hopper 16, a screw (not shown) disposed in the cylinder 18, an electric motor 20 coupled with the screw, an accumulator 22 communicatively connected to the cylinder 18, a plunger 24 communicatively connected to the accumulator 22, and a T die 28.

In the extruding machine 12 of the present embodying mode, resin pellets supplied from the hopper 16 are melted and are kneaded through the rotations of the screw by the electric motor 20 in the cylinder 18 into resin (molten resin) in the melted state. Next, the molten resin is transported to the accumulator 22 such that a fixed quantity thereof is accumulated, and then by the driving of the plunger 24, the molten resin is fed to the T die 28, so as to extrude from an extruding slit (not shown) of the T die 28, a thermoplastic resin sheet P in the contour of a continuous sheet. The thermoplastic resin sheet P extruded from the extruding slit of the T die 28 is pressed by a pair of rollers 30 disposed with a gap therebetween and is delivered downward to be suspended between the split molds 32. As a result, the thermoplastic resin sheet P is arranged between the split molds 32 in a state in which the sheet P has uniform thickness in the perpendicular direction (extruding direction).

Extruding performance of the extruding machine 12 is appropriately selected in consideration of the size of the resin molded product to be molded and the prevention of occurrence of the draw-down or the neck-in of the thermoplastic resin sheet P. Specifically, from the viewpoint of practice, the extruding quantity of one shot in the intermittent extrusion favorably ranging from 1 kg to 10 kg, and the extruding speed of the thermoplastic resin sheet P from the extruding slit is several hundreds of kg/h or more; or, more preferably, 700 kg/h or more. Further, from a viewpoint of the prevention of occurrence of the draw-down or the neck-in of the thermoplastic resin sheet P, the extrusion of the thermoplastic resin sheet P is favorably as short as possible; although depending on the kind of resin, the MFR value, and the melt tension value, it is favorable, in general, that the extrusion is completed in 40 seconds or less; or, more preferably in a range from 10 seconds to 20 seconds.

Hence, the extruding quantity per unitary area (1 $cm^2$) and unitary time (1 h) of the thermoplastic resin from the extruding slit is 50 kg/h $cm^2$ or more; or, more preferably 150 kg/h $cm^2$ or more. For example, in a situation wherein from an extruding slit of the T die 28 in which the slit gap is 0.5 mm and the length in the width direction of the slit is 1000 mm, a thermoplastic resin sheet P having a thickness of 1.0 mm, a width of 1000 mm, and a length in extruding direction of 2000 mm is extruded in 15 seconds by use of thermoplastic resin having a density of 0.9 $g/cm^3$, it is regarded that thermoplastic resin having a weight of 1.8 kg is extruded per one shot in 15 seconds, to obtain through calculation that the extruding speed is 432 kg/h and the extruding quantity per unitary area is about 86 kg/h $cm^2$.

Incidentally, the extruding slit disposed in the T die 28 is arranged downward in a perpendicular direction, and the thermoplastic resin sheet P extruded from the extruding slit is perpendicularly transported downward in a state in which it suspends directly from the extruding slit. In the extruding slit, by changing the slit gap, it is possible to change thickness of the thermoplastic resin sheet P.

However, the thermoplastic resin sheet P extruded from the T die 28 is favorably adjusted such that in a state in which it is suspended between the split molds 32, that is, when it is clamped, thickness thereof in the extruding direction is uniform. In this situation, it is also possible that the slit gap is gradually enlarged beginning at the extrusion start point to be maximum at the extrusion end point. As a result, the thickness of the thermoplastic resin sheet P extruded from the T die 28 is gradually enlarged beginning at the extrusion start point; however, the thermoplastic resin sheet P extruded in the melted state is extended by its own weight to be gradually thinner from the lower end to the upper end of the sheet; hence, the thick portion extruded by enlarging the slit gap cancels the thin portion due to extension by the draw-down phenomenon, to thereby conduct the adjustment for the uniform thickness from the upper end to the lower end of the sheet.

In the molding device 100 of the present embodying mode, a thermoplastic resin sheet P pinched between a pair of rollers 30 is downward fed by the rotations of the pair of rollers 30, to extend and to thin down the thermoplastic resin sheet P; by adjusting the relationship between the extruding speed of the thermoplastic resin sheet P extruded from the T die 28 and the feeding speed of the thermoplastic resin sheet P fed from the pair of rollers 30, it is possible to prevent occurrence of the draw-down or the neck-in of the thermoplastic resin sheet P. Hence, it is possible to mitigate restrictions on the kind of resin to be adopted, in particular, on the MFR value, the MT value, and the extruding quantity per unitary time.

The pair of rollers 30 are arranged to have axial symmetry with respect to the thermoplastic resin sheet P extruded in a state in which it downward suspends from the extruding slit. The diameter of the rollers 30 and the length in the axial direction of the rollers 30 are appropriately set according to the extruding speed of the thermoplastic resin sheet P to be molded, the length in the extruding direction of the thermoplastic resin sheet P, the width thereof, the kind of resin, and the like. Further, in respective outer surfaces of the pair of rollers 30, there are disposed wrinkles in the contour of depressions and projections. The wrinkles in the contour of depressions and projections are favorably disposed, in the outer surfaces of the rollers 30, to be uniformly distributed throughout the surfaces to be brought into contact with the thermoplastic resin sheet P, and the depth and the density thereof are only to be appropriately determined, in order that the thermoplastic resin sheet P is smoothly fed downward by the pair of rollers 30, in consideration of prevention of occurrence of slippage between the respective outer surfaces of the pair of rollers 30 and the corresponding surfaces of the thermoplastic resin sheet P. Incidentally, although it is possible to form the wrinkles in the contour of depressions and projections, for example, by the sand-blast process, it is favorable to form them by the blast machine by adopting a coarse level of about coarse 60.

The wrinkles in the contour of depressions and projections disposed respectively in the pair of rollers 30 are not disposed to transcribe the wrinkle pattern onto the surfaces of the thermoplastic resin sheet P, but, intrinsically, are disposed to prevent occurrence of slippage between the respective outer surfaces of the pair of rollers 30 and the corresponding surfaces of the thermoplastic resin sheet P.

When transcribing the wrinkle pattern onto the surfaces of the thermoplastic resin sheet P, it is an ordinary practice that one of the pair of rollers is a wrinkle roll and the other one thereof is a lubber roll; however, in the pair of rollers 30 of the present embodying mode, by disposing wrinkles in the outer surfaces respectively of the pair of rollers 30, the pair of rollers 30 respectively and securely hold the corresponding surfaces of the thermoplastic resin sheet P; on the other hand, by restricting the pushing force onto the thermoplastic resin sheet P by the pair of rollers 30, it is possible to prevent, immediately after feeding the thermoplastic resin sheet P by the pair of rollers 30, the transcription of the wrinkle pattern onto the surfaces of the thermoplastic resin sheet P.

The pair of rollers 30 are made of metal, for example, aluminum; each of the paired rollers 30 is equipped with surface temperature adjusting means to adjust, depending on the temperature of the thermoplastic resin sheet P in the melted state, the surface temperature of the roller 30; in the configuration thereof, by flowing coolant through the inside of the roller 30 and by circulating the coolant, heat exchange is performed such that the surface of the roller 30 is not excessively heated by the thermoplastic resin sheet P in the melted state clamped by the pair of rollers 30.

The outer surfaces of the pair of rollers 30 are heated through heat conduction when the pair of rollers 30 are brought into contact with the thermoplastic resin sheet P in the melted state; by cooling the outer surfaces of the pair of rollers 30 from the inside, an event is prevented in which the thermoplastic resin sheet P in the melted state clamped by the pair of rollers 30 adheres onto the outer surface of the roller 30 and is wound around the roller 30 by the rotations of the roller 30, and the thermoplastic resin sheet P is not fed downward. In this situation, from a viewpoint of prevention of the winding, it is favorable to lower the surface temperature of the rollers 30; however, from a viewpoint of the molding of the thermoplastic resin sheet P later, when the surface temperature of the rollers 30 is too low, the thermoplastic resin sheet P in the melted state is contrarily cooled too much by the surfaces of the rollers 30, to cause hindrances in the molding. Hence, it is required to set the surface temperatures respectively of the pair of rollers 30 to be lower, in a predetermined range of temperature, than the temperature of the thermoplastic resin sheet P in the melted state extruded toward the pair of rollers 30. The predetermined range of temperature is determined according to the kind of the thermoplastic resin sheet P in the melted state; for example, when the thermoplastic resin sheet P includes amorphous resin, the predetermined range of temperature ranges from about 80° C. to about 95° C.; and when the thermoplastic resin sheet P includes crystalline resin, the predetermined range of temperature ranges from about 50° C. to about 90° C. In this situation, to conduct temperature adjustment of the surface temperatures of the pair of rollers 30, when the insides respectively of the pair of rollers 30 are water-cooled, it is desirable to set the temperature of the coolant according to the kind of the thermoplastic resin sheet P; and the temperature of the coolant is to be kept constant during the molding of the thermoplastic resin sheet P.

The clamping machine 10 of the present embodying mode includes the split molds 32 and a mold driving machine (not shown) to move the split molds 32 in a direction substantially vertical to the supply direction of the thermoplastic resin sheet P between an open position and a closed position.

The split molds 32 are arranged in a state in which the cavities 116 oppose each other, and the respective cavities 116 face substantially the perpendicular direction. In the surfaces of the cavities 116, depressions and projections are disposed according to the outer contour and the surface contour of the molded product molded based on the thermoplastic resin sheets P in the melted state. Also, in the peripheries of the cavities 116 of the split molds 32, pinch-off sections 118 are formed. The pinch-off sections 118 are formed in a circular contour in peripheries of the cavities 116 and project toward the opposing split molds 32. Hence, it is possible that when the split molds 32 are clamped, the tip end sections of the respective pinch-off sections 118 make contact with each other, to form the parting lines in the circumferential edges of the molded product.

Further, in the outer circumferential sections of the split molds 32, molding flasks 33 are slidably arranged, and the molding flasks 33 are movable relative to the split molds 32. More specifically, one of the molding flasks 33A projects toward the split molds 32B and is able to come into contact with one side surface of the thermoplastic resin sheet P disposed between the split molds 32; and the other one of the molding flasks 33B projects toward the split molds 32A and is able to come into contact with the other side surface of the thermoplastic resin sheet P disposed between the split molds 32.

The split molds 32 are driven by the mold driving machine (not shown) so that the thermoplastic resin sheets P in the melted state are arranged between the split molds 32 at the open position. Further, at the closed position, the pinch-off sections 118 of the split molds 32 make contact with each other so as to form a sealed space in the split molds 32. Incidentally, for the movement of each split mold 32 from the open position to the closed position, the closed position is the position of the central line of the thermoplastic resin sheets P in the melted state; each split mold 32 is driven by the mold driving machine and moves toward the position.

The thermoplastic resin sheets P are molded using polypropylene, polyolefin-based resin, and the like. For the thermoplastic resin sheets P of the present embodying mode, from a viewpoint of prevention of occurrence of dispersion in thickness due to the draw-down and the neck-in, it is favorable to employ a resin material having high melt tension; on the other hand, to improve transcribing performance and tracing performance with respect to the split molds 32, it is favorable to employ a resin material having high fluidity.

Specifically, polyolefin (e.g., polypropylene and high-density polyethylene) which is homopolymer or copolymer of olefin-class substances such as ethylene, propylene, butene, isoprene pentene, and methyl penten and which has MFR (measured at a test temperature of 230° C. and with a test load of 2.16 kg according to JIS K-7210) equal to or less than 3.5 g/10 min at 230° C. is applicable. When MFR is more than 3.5 g/10 min, the draw-down becomes excessive and it is difficult to mold a thin molded product.

Further, to the thermoplastic resin sheet P of the present embodying mode, in order to mold an in-panel duct 200 having a mean thickness ranging from 0.3 mm to 1.2 mm and a thickness variation factor of 0.3 or less, powder inorganic filler of silica, mica, talc, calcium carbonate, or the like or fibrous inorganic filler of glass fiber, carbon fiber, or the like is added. As a result, it is possible to reduce the mean thickness, and an in-panel duct 200 having a complex contour can be molded. Incidentally, when the quantity of added inorganic filler is increased, roughness appears on the surface of the molded product, and pinholes easily take place. Hence, to suppress the roughness on the surface of the molded product and to prevent pinholes from easily taking place, it is favorable to add the inorganic filler at less than 30 wt %. Moreover, when molding the in-panel duct 200 of the present embodying mode, it is more favorable to employ power filler than to employ fibrous filler. This is because the fiber faces the extruding direction when fibrous filler is employed and it is difficult to suppress wrinkles in a direction vertical to the extruding direction. Further, among the powder fillers, particularly, talc is favorably employed. This is because talc disperses well in resin.

Also, to the thermoplastic resin sheet P, to prevent cracks due to shock, styrene-hydrate-based thermoplastic elastomer may also be added in a range of less than 30 wt %; more favorably, less than 15 wt %. As styrene-hydrate-based thermoplastic elastomer, it is possible to use styrene-ethylene•butylene-styrene block copolymer, styrene-ethylene•propylene-styrene block copolymer, styrene-hydrate-butadiene rubber, and mixtures thereof.

Further, to the thermoplastic resin sheet P, it is also possible to add plasticizers, stabilizers, coloring agents, antistatic agents, fire retardants, foaming agents, and the like.

Next, referring to FIGS. 4 to 9, description will be given of a molding process example of the in-panel duct 200 of the present embodying mode.

First, as shown in FIG. 4, the thermoplastic resin sheets P are extruded from the T dies 28, and the extruded thermoplastic resin sheets P are fed through a pair of rollers 30 to adjust thickness of the thermoplastic resin sheets P and are suspended between the pair of rollers 30.

In the molding device 100 of the present embodying mode, the relative speed difference between the extruding speed of the thermoplastic resin sheets P and the feed speed at which the thermoplastic resin sheets P are fed downward by the pair of rollers 30 is adjusted by the rotation speed of the pair of rollers 30 such that when the thermoplastic resin sheets P pass between the pair of rollers 30, they are drawn downward by the pair of rollers 30 and are extended to be reduced in thickness; as a result, occurrence of the drawdown or the neck-in is prevented.

In this situation, in each of the pair of rollers 30, wrinkles are dispose in the contour of depressions and projections on the surfaces of the rollers 30 and a gear mechanism is disposed at one end of the rollers 30, to respectively transmit rotation driving force of a rotation driving roller 30BA to a rotation driven roller 30BB and rotation driving force of a rotation driving roller 30AA to a rotation driven roller 30AB such that no rotation speed difference appears between the rotation driving roller 30A and the rotation driven roller 30B, which prevents occurrence of wrinkles or shear marks on the surfaces of the thermoplastic resin sheets P.

Further, in each of the pair of rollers 30, coolant is circulated through the rollers 30 to cool the rollers 30, to set the temperature of the outer surface of each roller 30 to be lower in a predetermined temperature range than the temperature of the thermoplastic resin sheet P in a melted state. This resultantly prevents the event in which when the thermoplastic resin sheet P in a melted state is clamped by the pair of rollers 30, the thermoplastic resin sheet P in a melted state adheres onto the surface the roller 30 and is wound around the roller 30 by the rotations of the roller 30; on the other hand, it is possible to keep the thermoplastic resin sheet P in a melted state suitable for the molding.

Incidentally, in association with the adjustment of the number of rotations of the pair of rollers 30, the extruding slit gap adjustment may be carried out.

Figure 5:
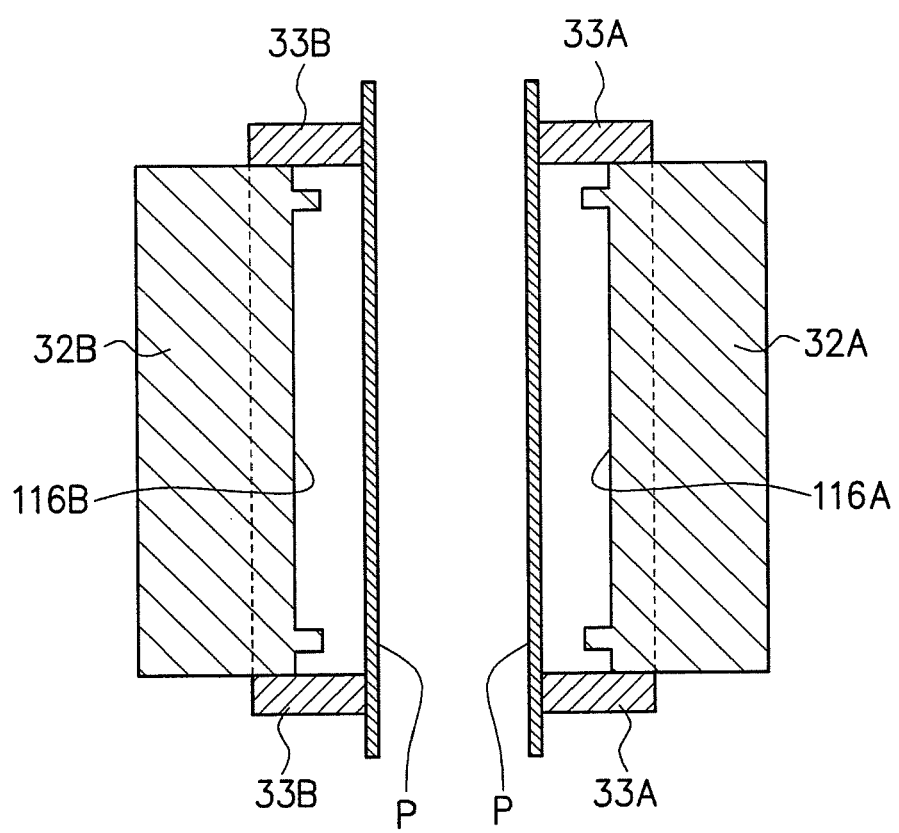
FIG. 5 is a diagram showing a state wherein in the molding device 100 shown in FIG. 4, thermoplastic resin sheets P are disposed between split molds 32 and the space between cavities 116 of the split molds 32 are closed by molding flasks 33.

As shown in FIG. 4, after two sheets of thermoplastic resin P are arranged between the split molds 32, the molding flasks 33 of the split molds 32 are moved, as shown in FIG. 5, toward the sheets of thermoplastic resin P, to bring the molding flasks 33 existing on the outer circumferences of the split molds 32 into contact with side surfaces of the sheets of thermoplastic resin P. As a result, a sealed space is formed by the sheets of thermoplastic resin P, the molding flasks 33, and the cavities 116.

Figure 6:
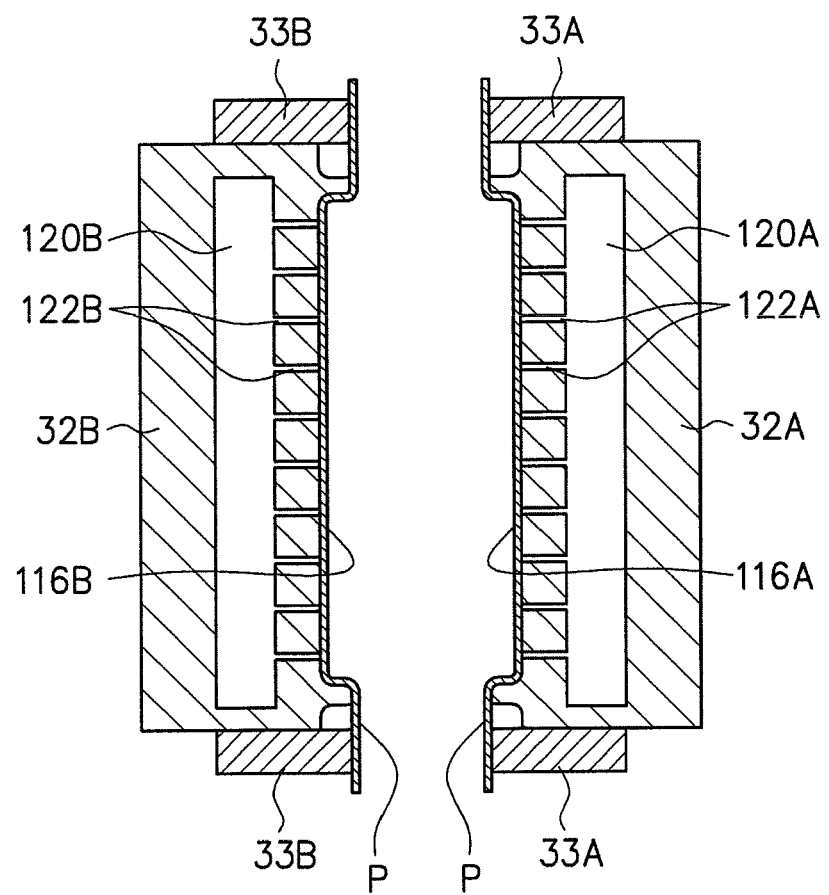
FIG. 6 is a diagram showing a state wherein in the mode shown in FIG. 5, the thermoplastic resin sheets P are vacuum-sucked onto the cavities 116 of the split molds 32.

Next, as shown in FIG. 6, the air in the sealed space is sucked via sucking holes 122 by vacuum sucking rooms 120 to adsorb the sheets of thermoplastic resin P onto the cavities 116, to form the sheets of thermoplastic resin P in a contour according to the surfaces of the cavities 116.

In this situation, the sheets of thermoplastic resin P before the suction are uniform in thickness in the upper and lower directions; hence, it is possible to prevent an event in which due to the distribution of thickness caused by the blowing ratio, the forming process is not satisfactorily performed.

Figure 7:
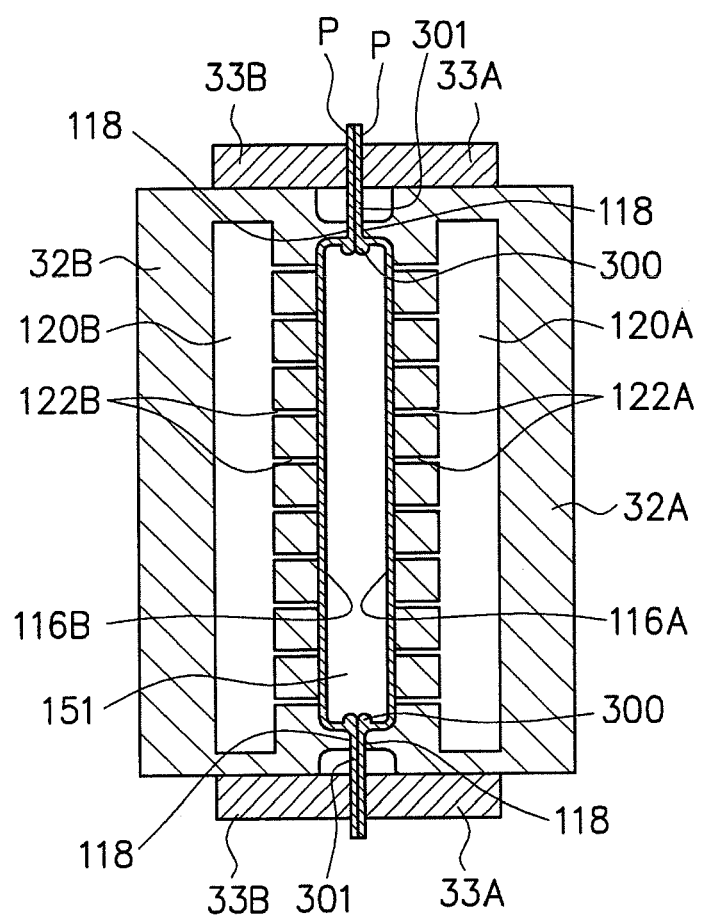
FIG. 7 is a diagram showing a state wherein in the mode shown in FIG. 6, the split molds 32 are clamped.

Next, as shown in FIG. 7, the molding flasks 33 and the split molds 32 are moved as one unit to approach each other, to thereby clamp the split molds 32 such that the circumferential edge sections of the sheets of thermoplastic resin P are welded onto each other by the pinch-off sections 118 of the split molds 32. As a result, the parting lines PL are formed on the joint surfaces of the two sheets of thermoplastic resin P, and a sealed hollow section 151 is formed in the two sheets of thermoplastic resin P.

Incidentally, in the pinch-off sections 118 as sections to form projections 300 on the duct inner surface sides, pinch-off sections 119 and compression sections 120 are disposed as shown in FIGS. 8 (*a*) and (*b*); when the circumferential edge sections of the sheets of thermoplastic resin P are welded onto each other by the pinch-off sections 118, resin is projected (swelled) onto the duct inner surface sides by the compression sections 120, to form the projections 300.

The pinch-off sections 118 which are sections to form the projections 300 on the duct inner surface sides and to form crashed sections 301 on the duct outer surface sides include, as shown in FIG. 8 (*a*), the compression sections 120 on the duct side and the pinch-off sections 119 on the opposite side of the duct such that resin is projected (swelled) onto the duct inner surface sides by the compression sections 120 to form the projections 300 and resin is crashed by the compression sections 120 to form crashed sections 301 on the duct outer surface sides, and the resin is cut off by the pinch-off sections 119. As a result, the projections 300 are formed on the duct inner surface sides and the crashed sections 301 are formed on the duct outer surface sides.

The pinch-off sections 118 of sections in which no crashed section 301 is formed on the duct outer surface sides include, as shown in FIG. 8 (*a*), the pinch-off sections 119 on the duct sides and the compression sections 120 on the opposite side of the duct such that resin is projected (swelled) onto the duct inner surface sides by the compression sections 120 to form the projections 300, and the resin is cut off by the pinch-off sections 119. As a result, the projections 300 are formed on the duct inner surface sides and no crashed section 301 is formed on the duct outer surface sides.

In the cavities 116 to mold the in-panel duct 200 of the present embodying mode, the pinch-off section 118 of the configuration example shown in FIG. 8 (*a*) is configured in the A-A' cross section of the cavity 116 shown in FIG. 8 (*c*), and the pinch-off section 118 of the configuration example shown in FIG. 8 (*b*) is configured in the B-B' cross section of the cavity 116 shown in FIG. 8 (*c*).

Incidentally, the configuration examples of the compression sections 120 shown in FIGS. 8 (*a*) and (*b*) are only examples, and only if they are in a contour in which it is possible to form the projections 300 by extruding (swelling) resin onto the duct inner surface sides and it is possible to form the crashed sections 301 by compressing resin at positions of the compression sections 120 and by crashing the resin onto the duct outer surface sides, any configuration is applicable. However, the compression sections 120 are favorably configured in a contour in which when the circumferential edge sections of the sheets of thermoplastic resin P are welded onto each other, the resin is easily swelled onto the duct inner surface sides and the resin is easily compressed at the positions of the compression sections 120. As a result, even when the circumferential edge sections of thin sheets of thermoplastic resin P are welded onto each other, it is possible to increase thickness A of the parting lines PL on which the projections 300 are formed.

Figure 9:
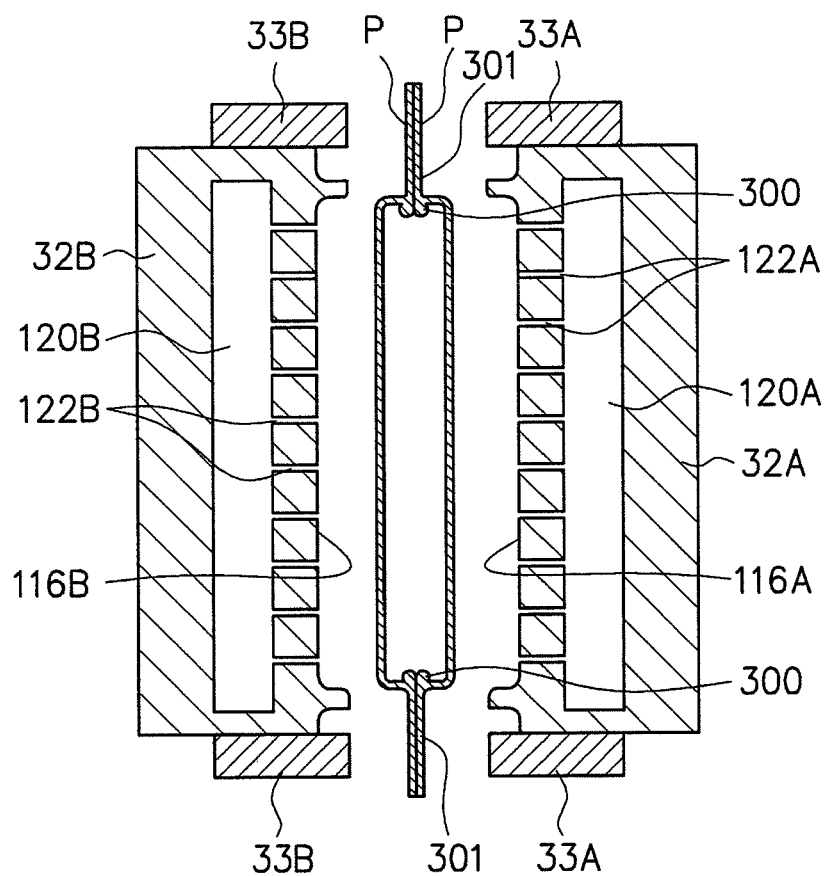
FIG. 9 is a diagram showing a state wherein in the mode shown in FIG. 7, the split molds 32 are unclamped.

Next, as shown in FIG. 9, the molding flasks 33 and the split molds 32 are moved as one unit to be apart from each other, to thereby unclamp the split molds 32, and the molded resin molded product is taken out, and then burrs of the outer circumferential sections are removed. This completes the in-panel duct 200 shown in FIG. 1.

<Operation and Effects of In-Panel Duct 200 of Present Embodying Mode>

As above, the in-panel duct 200 of present embodying mode includes the projections 300 on the duct inner surface sides on the parting lines PL; hence, it is possible to provide an in-panel duct 200 in which the welding strength of the parting lines P is increased and which facilitates the attaching job.

Additionally, the in-panel duct 200 of present embodying mode includes the projections 300 in the inner circumferences of the openings 204 to 207; hence, even when no crashed section 301 is formed on the outer circumferences of the openings 204 to 207, it is possible that the welding strength of the parting lines P of the openings 204 to 207 is increased and cracks do not easily take place in the parting lines P of the openings 204 to 207.

Incidentally, the in-panel duct 200 of present embodying mode is favorably molded by the sheet direct molding described above. When molding it by the sheet direct molding, it is possible to adjust both of thickness of the first wall section 201 and that of the second wall section 202; hence, even when the mean blow ratio difference is large (for example, 0.05 or more) between the first wall section 201 and the second wall section 202, it is possible to reduce the thickness difference therebetween and to suppress deformation of the in-panel duct 200 due to the cooling cycle. As a result, it is possible to mold an in-panel duct 200 in which deformation of the in-panel duct 200 due to the cooling cycle is reduced and which has a contour having a high degree of freedom.

For example, in a situation wherein the in-panel duct 200 of present embodying mode is molded by the parison blow molding, when the mean blow ratio difference is large (for example, 0.05 or more) between the first wall section 201 and the second wall section 202, the thickness difference between the first wall section 201 and the second wall section 202 becomes conspicuous, and the deformation of the in-panel duct 200 due to the cooling cycle is also conspicuous.

In contrast, when the in-panel duct 200 of the present embodying mode is molded by the sheet direct molding, both of thickness of the first wall section 201 and that of the second wall section 202 can be adjusted; hence, even when the mean blow ratio difference is large (for example, 0.05 or more) between the first wall section 201 and the second wall section 202, the thickness difference therebetween can be reduced; hence, the deformation of the in-panel duct 200 due to the cooling cycle can be suppressed. Particularly, when the mean blow ratio difference is 0.1 or more, the deformation suppressing effect is increased.

Figure 10:
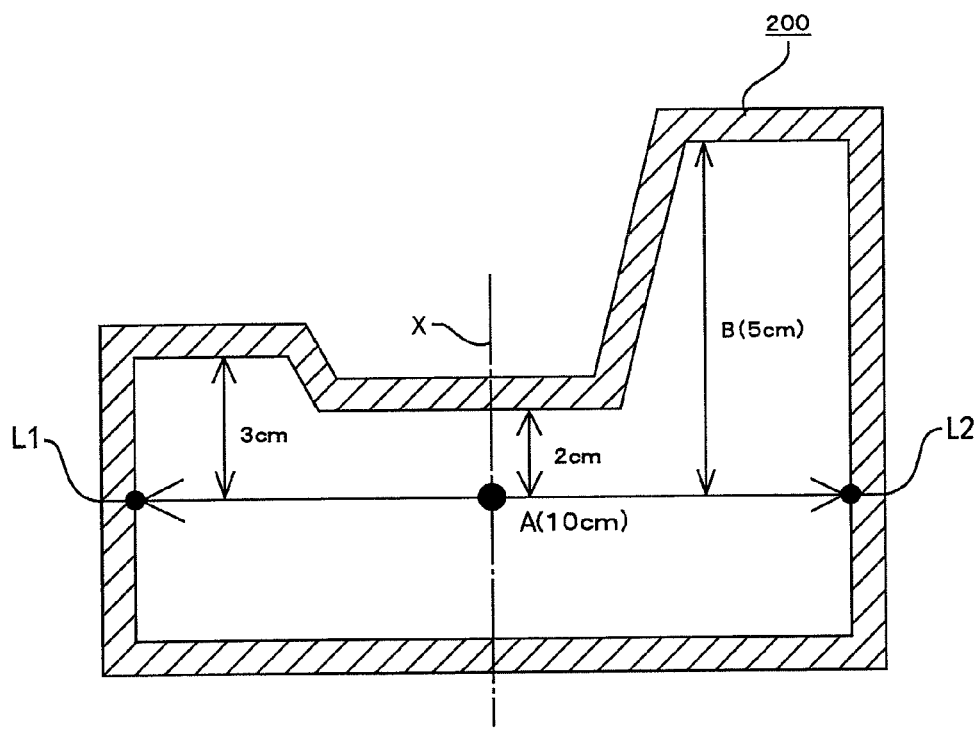
FIG. 10 is diagram to explain the blow ratio.

Incidentally, the blow ratio of the present embodying mode is, for example, as shown in FIG. 10, a ratio (B/A), in the cross section vertical to the hollow extending direction, between length A of a line segment connecting one parting line L1 to the other parting line L2 and distance B from the line segment to an inner wall surface most apart from the line segment. In the situation of FIG. 10, when depressions and projections are present in the contour of the cross section, the blow ratio is 0.5. Further, the mean blow ratio is the mean value of the blow ratio measured at an equal interval of about 100 mm in the hollow extending direction of the resin molded product.

Moreover, in a duct to supply cooled air and/or clean air, it is required to dispose an air supply path along a wall surface in the periphery of the duct or in other than the periphery; hence, the supply path has a meandering contour in many cases. Hence, on the wall surfaces of the blow-molded duct, the gap between a section with a high blow ratio and a section with a low blow ratio becomes very large, which leads to a problem of occurrence of a thin section and occurrence of pinholes. As a result, when the blow ratio gap is very large, it is an ordinary practice, in order to prevent pinholes, that the setting thickness is generally large in the blow molding. Particularly, when conducting the blow molding with foam resin, extension of parison is lowered as compared with a situation of non-foam resin; hence, the setting of thickness is inevitably conducted to prevent pinholes. As a result, when the mean blow ratio difference is large between the first wall section 201 and the second wall section 202, the duct thickness difference becomes large, and warps occur in the duct depending on cases.

In contrast, when molding the duct by the sheet direct molding, both of thickness of the first wall section 201 and that of the second wall section 202 can be adjusted; hence, even when the mean blow ratio difference is large between the first wall section 201 and the second wall section 202, the thickness difference can be reduced therebetween; hence, it is possible to prevent occurrence of warps in the duct.

(Second Embodying Mode)

Next, description will be given of a second embodying mode.

In the connecting section 204' disposed in the opening 204 of the in-panel duct 200 of the first embodying mode, as shown in FIG. 2, no crashed section 301 is formed on the outer surface side of the connecting section 204', and the projections 300 are formed on the inner surface side of the connecting section 204' such that the welding strength of the parting lines PL of the connecting section 204' is increased by the projections 300. Incidentally, the other connecting sections 205' to 207' are also configured in the same way as for the connecting section 204' shown in FIG. 2 such that the welding strength of the parting lines PL of the connecting sections 205' to 207' is increased by the projections 300.

Figure 11:
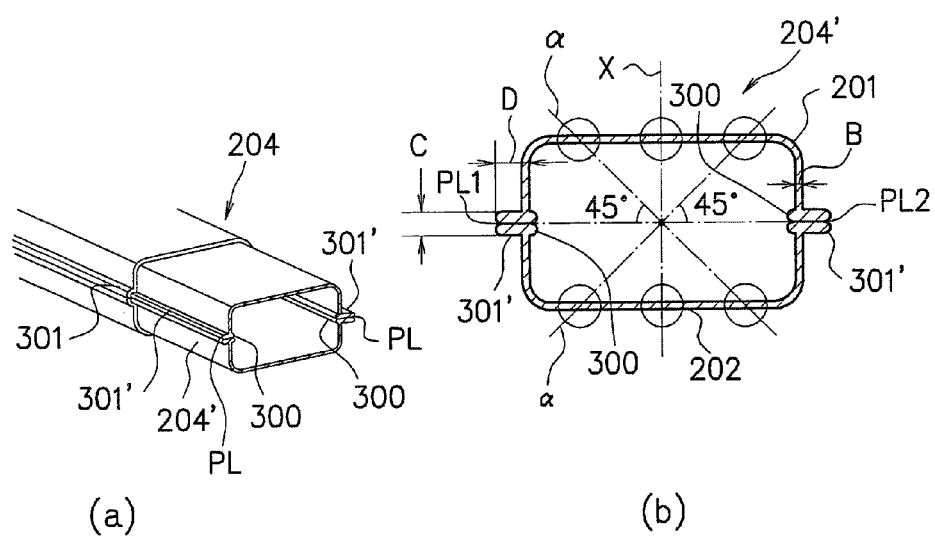
FIG. 11 is a diagram showing a magnified configuration example (a) of a periphery of a connecting section 204' disposed in an opening 204 of an in-panel duct 200 of a second embodying mode and a cross-sectional configuration example (b) vertical to the hollow extending direction of the connecting section 204'.

In the connecting section 204' disposed in the opening 204 of the in-panel duct 200 of the second embodying mode, as shown in FIGS. 11 and 12, the crashed sections 301' are formed also on the outer surface side of the connecting section 204' such that the welding strength of the parting lines PL of the connecting section 204' is further increased by the crashed sections 301' and the projections 300. As a result, it is possible to provide an in-panel duct 200 in which occurrence of cracks beginning at edge sections of the duct 200 is further prevented. In addition, since the crashed sections 301' are formed on the outer surface side of the connecting section 204' in the configuration, it is possible to prevent an event in which other members 500 to be connected to the connecting section 204' are erroneously attached.

The crashed sections 301' formed in the connecting section 204' may be formed, as shown in FIGS. 11 and 12, apart from the crashed sections 301 formed in other than the connecting section 204'; however, it is also possible to form two crashed sections 301' and 301 continuously as one unit. Further, the crashed sections 301' formed in the connecting section 204' are not necessarily formed throughout the outer surface side of the connecting section 204' and may also be formed in at least part of the outer surface side of the connecting section 204'. Next, referring to the accompanying drawings, description will be given in detail of the in-panel duct 200 of the present embodying mode. Incidentally, the in-panel duct 200 of the present embodying mode is a variation of the configuration example of the connecting sections 204' to 207' disposed in the openings 204 to 207 of the in-panel duct 200 of the first embodying mode described above and the configuration example of the other members 400 to be connected to the connecting sections 204' to 207'; hence, referring to FIGS. 11 and 12, description will be given of a configuration example of the connecting sections 204' to 207' of the present embodying mode and a configuration example of the other members 500. Incidentally, while FIGS. 11 and 12 show a configuration example of the connecting sections 204' and a configuration example of the other members 500 to be connected to the connecting section 204', the other connecting sections 205' to 207' are also configured in the same way as for the connecting section 204' shown in FIGS. 11 and 12.

<Configuration Example of Connecting Sections 204' to 207' Disposed in Openings 204 to 207 of In-Panel Duct 200>

The connecting sections 204' to 207' disposed in the openings 204 to 207 of the in-panel duct 200 of the present embodying mode are male-type connecting sections and are inserted, as shown in FIGS. 11 and 12, in the inner surface side of the other members 500 for the connection. The other member 500 is a female-type member which connects to the connecting section 204' to flow fluid such as air; as shown in FIG. 12, it includes a female-type connecting section 501 to connect to the male-type connecting section 204', and the female-type connecting section 501 is of a contour in which the male-type connecting section 204' can be inserted. Also, the female-type connecting section 501 includes a groove section 502 in a contour corresponding to the crashed section 301' formed in the male-type connecting section 204', and includes a crashed section 503 on the outer surface side the groove section 502. The crashed section 503 may be formed, like the crashed section 301' formed in the male-type connecting section 204', by crashing resin by the split molds.

In the in-panel duct 200 of the present embodying mode, when the male-type connecting section 204' is connected to the female-type connecting section 501, the crashed section 301 overlaps with the groove section 502 to be connected without gaps; in this situation, load is imposed on the groove section 502. However, the crashed section 503 is disposed on the outer surface of the groove section 502; hence, even load is imposed on the groove section 502, cracks cannot easily occur in the groove section 502.

In the in-panel duct 200 of the present embodying mode, the projection 300 is formed on the inner surface side of the connecting section 204' and the crashed section 301 is formed on the outer surface side of the connecting section 204'; hence, as shown in FIG. 11, it is possible that the welding areas of the parting lines PL are increased and the welding strength of the parting lines PL is enhanced. The welding areas of the parting line PL are the areas in which the first wall section 201 and the second wall section 202 are welded onto each other, and indicate the sections of the parting lines PL1 and PL2 shown in FIG. 11 (b). The projection 300 formed on the inner surface side of the connecting section 204' of the present embodying mode is the same as for the first embodying mode described above.

The relationship between mean thickness B in a predetermined cross section of the in-panel duct 200 and thickness C of the crashed section 301' in the predetermined cross section is favorably thickness C=1.0 B to 1.8 B by using the thickness B as the reference. When thickness C of the crashed section 301' is less than 1.0 B, rigidity of the crashed section 301' is lowered and the crashed section 301' easily cracks; as a result, the welding strength of the parting lines PL is lowered. Hence, thickness C of the crashed section 301' is favorably 1.0 B or more. Further, when thickness C of the crashed section 301' is 1.8 B or more, the compression of the crashed section 301' is insufficient; hence, the welding strength of the parting lines PL is lowered. Hence, thickness C of the crashed section 301' is favorably 1.8 B or less.

In addition, projection length D of the crashed section 301' from the duct inner surface favorably ranges as D=2.0 B to 10.0 B. When projection length D of the crashed section 301' is 2.0 B or more, it is possible to increase the welding areas of the parting lines PL to securely enhance the welding strength of the parting lines PL. Incidentally, thickness C and projection length D of the crashed section 301' described above apply not only to the crashed sections 301' formed in the connecting section 204' but also to the crashed section 301 formed in other than the connecting section 204'.

Further, mean thickness B in the predetermined cross section of the in-panel duct 200 is the mean value of thickness at six points on the predetermined cross section shown in FIG. 11 (b) and is the same as for the first embodying mode.

In the connecting section 204' of the present embodying mode, the crashed sections 301' are formed at two positions in the parting line PL on the outer circumference of the connecting section 204', and as shown in FIG. 11, the respective crashed sections 301' differ in the contour from each other. Since the respective crashed sections 301' differ in the contour from each other, it is possible to prevent an event in which other members 500 to be connected to the connecting section 204' are erroneously attached. Incidentally, the groove sections 502 formed in the connecting sections 501 of the other members 500 also vary in the contour as shown in FIG. 12 according to the contours of the crashed sections 301'.

Incidentally, while FIGS. 11 and 12 show configuration examples of the connecting section 204', also the other connecting sections 204' to 207' may be configured in the same way as for the connecting section 204' shown in FIGS. 11 and 12.

Additionally, the contour of the crashed sections 301' formed in the respective connecting sections 204' to 207' may be changed for each of the connecting sections 204' to 207'. In this situation, it is possible to consider a mode in which, for example, two crashed sections 301' formed in the connecting section 204' are equal in the contour to each other, two crashed sections 301' formed in the connecting section 205' are equal in the contour to each other, two crashed sections 301' formed in the connecting section 204' are different in the contour from each other, and two crashed sections 301' formed in the connecting section 205' are different in the contour from each other.

Further, like the connecting section 204' shown in FIGS. 11 and 12, it is also possible to consider a mode in which two crashed sections 301' formed in each of the connecting sections 204' to 207' are different in the contour from each other. When the contour of the crashed sections 301' formed in the respective connecting sections 204' to 207' are changed for each of the connecting sections 204' to 207', it is possible to prevent an event in which other members 500 to be connected to the respective connecting section 204' to 207' are erroneously attached. Also in this situation, the groove sections 502 formed in the connecting sections 501 of the other members 500 also respectively vary in the contour according to the contours of the crashed section 301'.

<Operation and Effects of In-Panel Duct 200 of Present Embodying Mode>

As above, the connecting section 204' disposed in the opening 204 of the in-panel duct 200 of present embodying mode includes the crashed section 301' on the outer surface side of the connecting section 204'. As a result, the welding strength of the connecting section 204' can be further increased; hence, it is possible to provide an in-panel duct 200 in which occurrence of cracks beginning at edge sections of the in-panel duct 200 is prevented.

Further, since the in-panel duct 200 of present embodying mode includes the crashed section 301' on the outer surface side of the connecting section 204', it is also possible to prevent an event in which other members 500 to be connected to the connecting section 204' are erroneously attached.

(Third Embodying Mode)

Next, description will be given of a third embodying mode.

In the in-panel ducts 200 of the first and second embodying modes, the openings 204 are disposed in edge sections of the body section of the in-panel duct 200 and include the connecting sections 204' to connect to the other members 400 and 500. The connecting sections 204' are male-type connecting sections which are inserted in the inner surface side of the other members 400 and 500 for the connection, and in the connecting sections 204' thereof, at least projections 300 are formed on the inner surface side of the connecting sections 204', to enhance the welding strength of the parting lines PL of the connecting sections 204', to prevent cracks in the openings 204.

In the in-panel duct 600 of the third embodying mode, the openings 603 and 604 are disposed in edge sections of the body section of the in-panel duct 600 and include, as shown in FIGS. 13 to 17, connecting sections 6031 and 6041 to connect to the other members 700 and trumpet-shaped sections 6032 and 6042 configured in a contour in which the opening diameter is enlarged when compared with the opening diameters of the connecting sections 6031 and 6041. The connecting sections 6031 and 6041 are female-type connecting sections in which the other members 700 are inserted in the inner surface sides of the connecting sections 6031 and 6041 for the connection, and include crashed sections 301 on the outer surface sides of the connecting sections 6031 and 6041, to enhance the welding strength of the parting lines PL of the connecting sections 6031 and 6041. Further, the trumpet-shaped sections 6032 and 6042 include projections 300 on the inner surface sides of the trumpet-shaped sections 6032 and 6042, to enhance the welding strength of the parting lines PL of the trumpet-shaped sections 6032 and 6042. As a result, even with the openings 603 and 604 including the female-type connecting sections 6031 and 6041, it is possible to enhance the welding strength of the parting lines PL of the openings 603 and 604, to prevent cracks in the openings 603 and 604. Next, referring to the accompanying drawings, description will be given in detail of the in-panel duct 600 of the present embodying mode.

<Configuration Example of In-Panel Duct 600>

Figure 13:
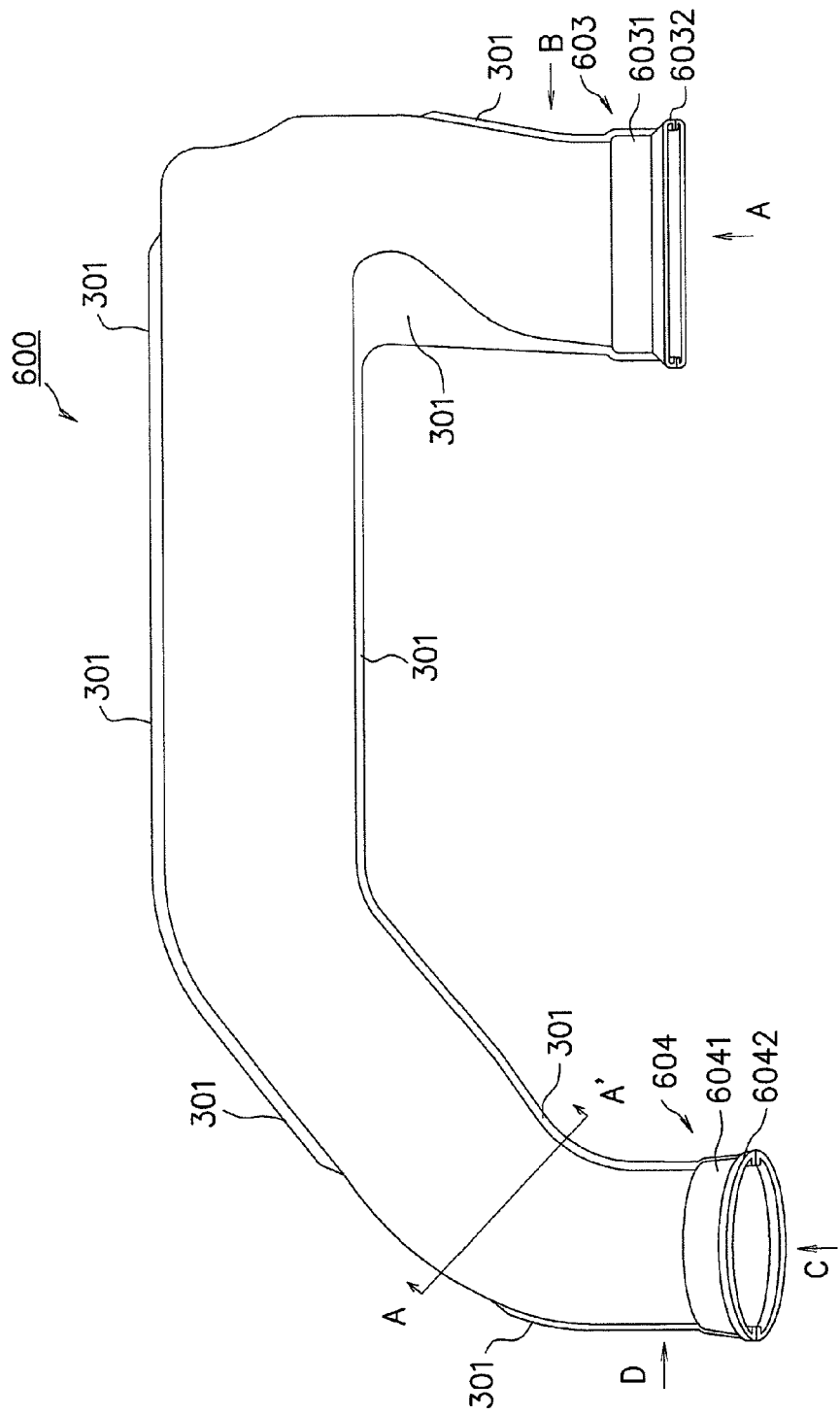
FIG. 13 is a diagram showing a configuration example of an in-panel duct 600 of a third embodying mode.
Figure 14:
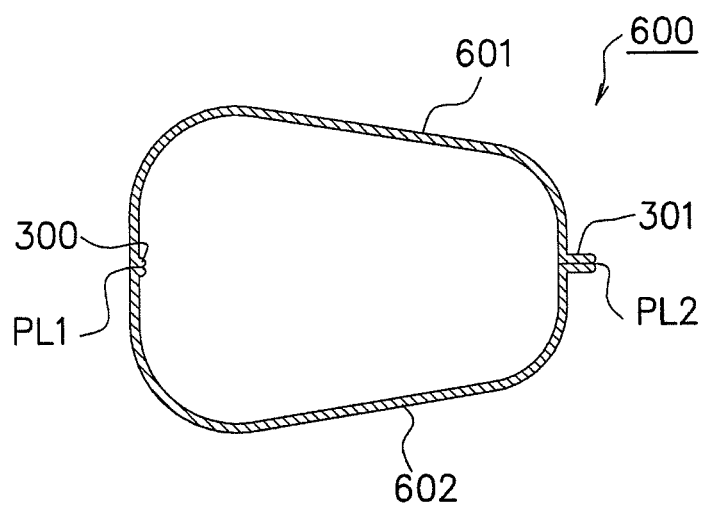
FIG. 14 is a diagram showing an A-A' cross-sectional configuration example of the in-panel duct 600 shown in FIG. 13.
Figure 15:
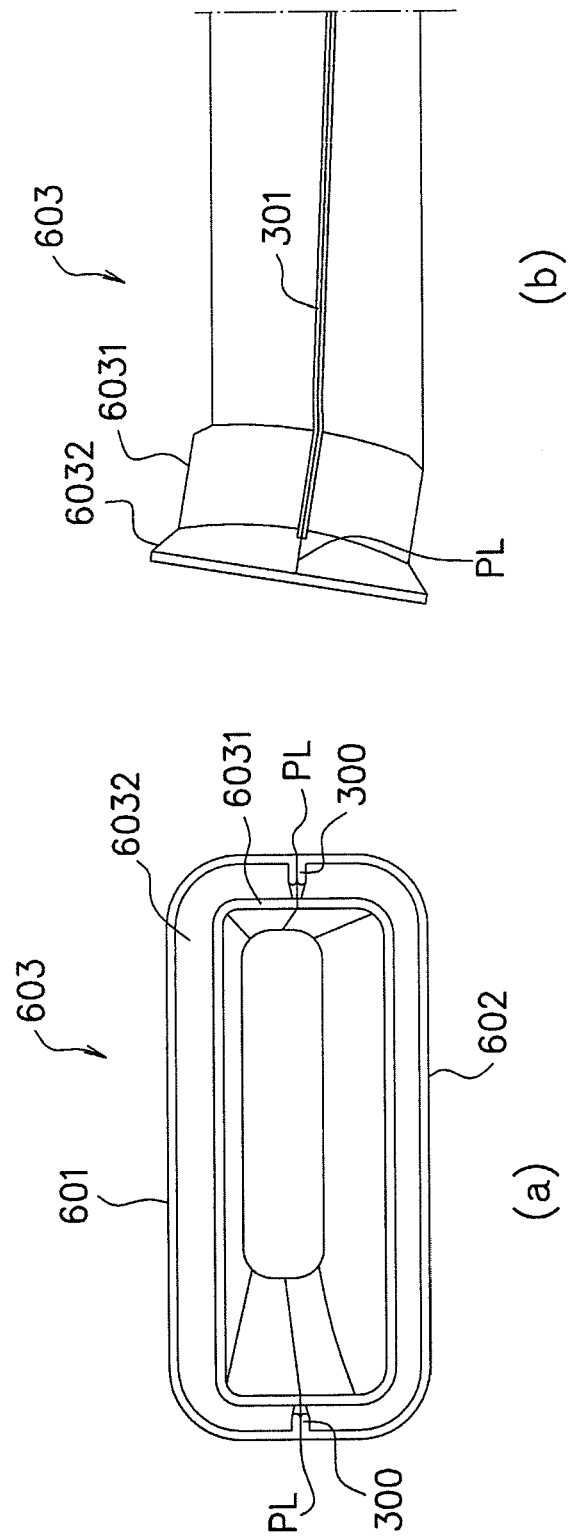
FIG. 15 is a diagram showing a configuration example of a first opening 603 of the in-panel duct 600 shown in FIG. 13.
Figure 16:
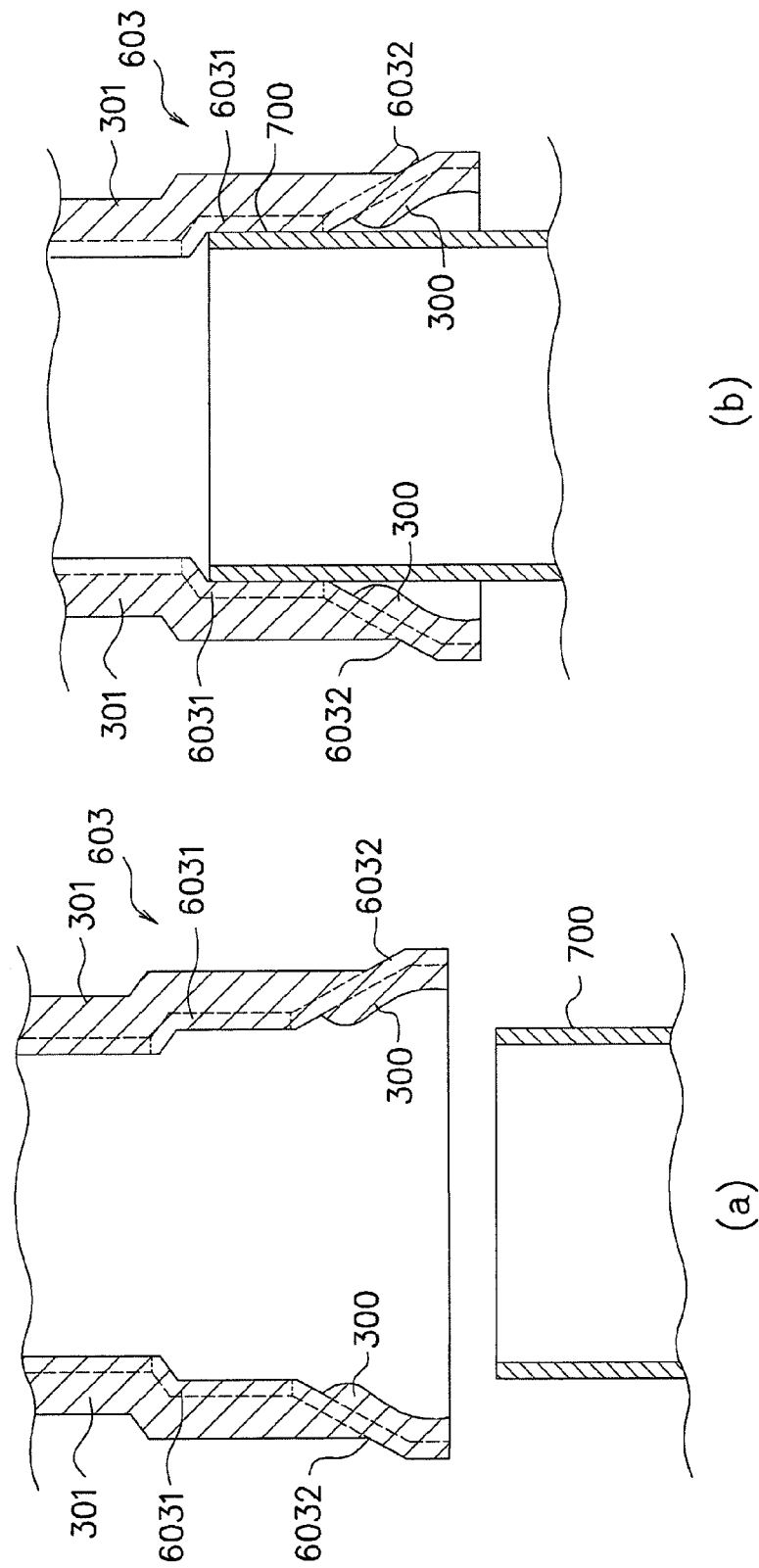
FIG. 16 is a diagram showing states before and after another member 700 is connected to the first opening 603.
Figure 17:
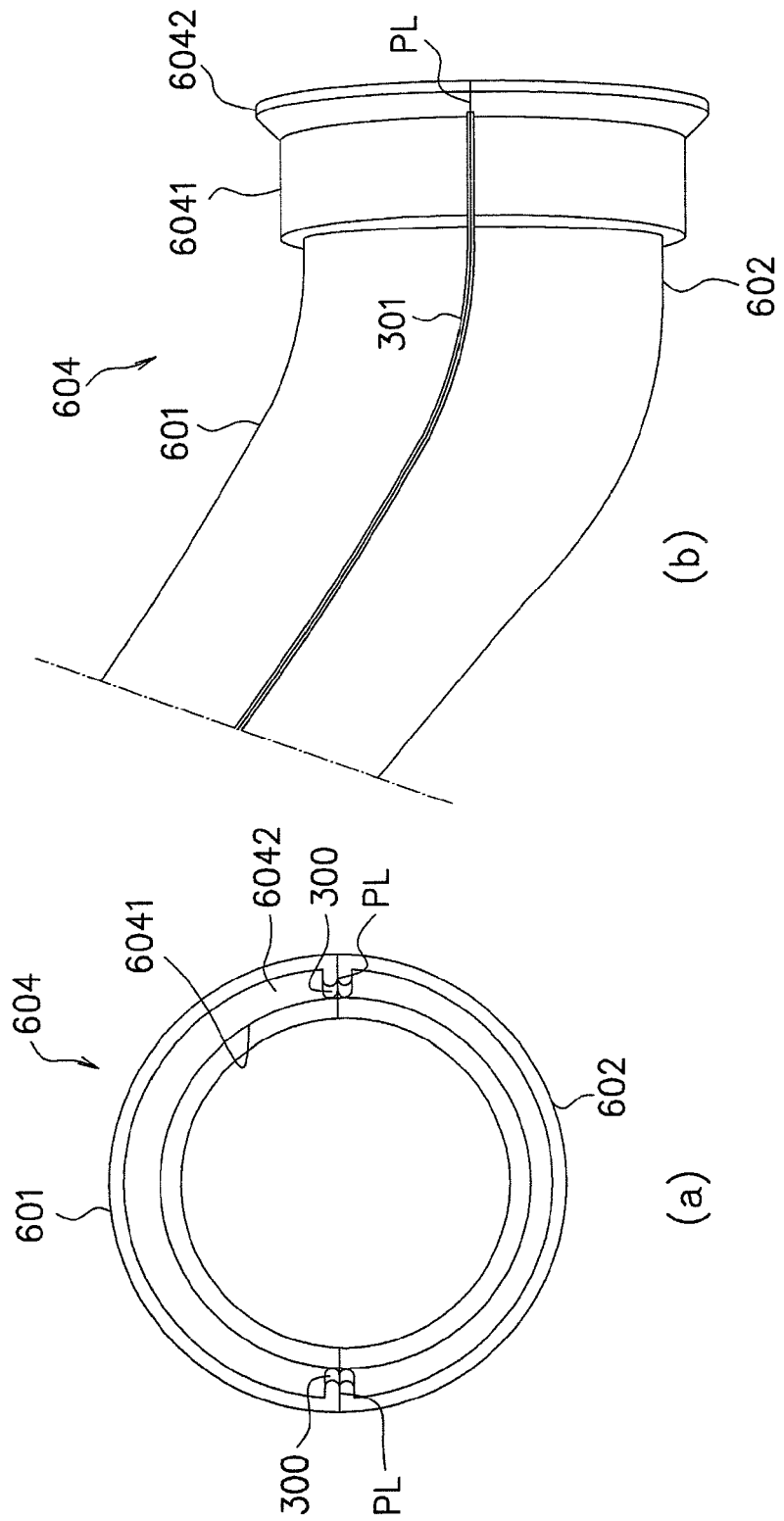
FIG. 17 is a diagram showing a configuration example of a second opening 604 of the in-panel duct 600 shown in FIG. 13.

First, referring to FIGS. 13 to 17, description will be given of a configuration example of the in-panel duct 600 of the present embodying mode. FIG. 13 is a diagram showing an overall configuration example of the in-panel duct 600 of the present embodying mode and FIG. 14 is a diagram showing an A-A' cross-sectional configuration example of the in-panel duct 600 shown in FIG. 13. Also, FIG. 15 is a diagram showing a configuration example of a first opening 603 of the in-panel duct 600 shown in FIG. 13 and FIG. 16 is a diagram showing states before and after another member 700 is connected to the first opening 603 and FIG. 17 is a diagram showing a configuration example of a second opening 604 of the in-panel duct 600 shown in FIG. 13.

The in-panel duct 600 of the present embodying mode is, like the in-panel duct 200 of the first and second embodying modes described above, a resin duct and includes, as shown in FIG. 14, a first wall section 601 and a second wall section 602 welded via the parting lines PL.

In the in-panel duct 600 of the present embodying mode, the parting lines PL are formed on the overall circumference of the in-panel duct 600, and on the parting lines PL, at least either a crashed section 301 or a projection 300 is formed. For example, as shown in FIG. 14, in the section of the parting line PL in which no crashed section 301 is formed on the outer surface side of the in-panel duct 600, a projection 300 is always formed on the inner surface side of the in-panel duct 600. Further, in the section of the parting line PL in which no projection 300 is formed on the inner surface side of the in-panel duct 600, a crashed section 301 is always formed on the outer surface side of the in-panel duct 600. As a result, on the parting lines PL of the in-panel duct 600, at least either the crashed section 301 or the projection 300 is always formed; hence, the welding strength of the parting lines PL of the in-panel duct 600 is enhanced and cracks do not easily take place in the parting lines PL. Incidentally, the crashed section 301 formed on the outer surface side of the in-panel duct 600 of the present embodying mode and the projection 300 formed on the inner surface side of the in-panel duct 600 of the present embodying mode may be configured in the same way as for the crashed sections 301 and 301' and the projections 300 described in conjunction with the first and second embodying modes.

Further, the in-panel duct 600 of the present embodying mode includes the first opening 603 and the second opening 604 in edge sections of the body section of the in-panel duct 600 such that fluid having passed through the in-panel duct 600 is fed via the first opening 603 and the second opening 604.

The first opening 603 includes, as shown in FIGS. 15 and 16, the first connecting section 6031 and the trumpet-shaped sections 6032. FIG. 15 shows a magnified configuration example of the first opening 603 shown in FIG. 13 in which (a) shows a configuration example viewed from direction A of the first opening 603 shown in FIG. 13 and (b) shows a configuration example viewed from direction B of the first opening 603 shown in FIG. 13. FIG. 16 is a diagram to explain states before and after another member 700 is connected to the first opening 603 and shows states of the periphery of the first opening 603 cut out along the parting line PL. FIG. 16 (*a*) shows a state before another member 700 is inserted in the first opening 603 and FIG. 16 (*b*) shows a state after another member 700 is inserted in the first opening 603 to connect another member 700 to the first opening 603. Incidentally, dotted lines drawn in the first opening 603 shown in FIG. 16 are drawn for convenience to explain respective areas of the first connecting section 6031, the trumpet-shaped section 6032, the crashed section 301, and the projection 300.

The first connecting section 6031 is a female-type connecting section in which another member 700 is inserted in the inner surface side of the first connecting section 6031, to connect to another member 700. The trumpet-shaped section 6032 is a section configured in a contour in which the opening diameter is enlarged when compared with the opening diameter of the first connecting section 6031. In the first opening 603, another member 700 is inserted, as shown in FIG. 16 (*a*), via the opening diameter of trumpet-shaped section 6032 in the inner surface side of the first connecting section 6031 to connect, as shown in FIG. 16 (*b*), another member 700 to the first connecting section 6031.

The first connecting section 6031 does not include, since another member 700 is inserted in the inner surface side of the first connecting section 6031 for the connection of another member 700, the projection 300 on the inner surface side of the first connecting section 6031, and includes the crashed section 301 on the outer surface side of the first connecting section 6031; the crashed section 301 increases the welding area of the parting line PL of the first connecting section 6031, to enhance the welding strength.

Further, the trumpet-shaped section 6032 is configured in a contour in which the opening diameter is enlarged when compared with the opening diameter of the first connecting section 6031, and hence includes the projection 300 on the inner surface side of the trumpet-shaped section 6032; the projection 300 increases the welding area of the parting line PL of the trumpet-shaped section 6032, to enhance the welding strength.

Incidentally, it is also possible to include the crashed section 301 on the outer surface side of the trumpet-shaped section 6032; however, since the trumpet-shaped section 6032 is of the contour in which the opening diameter enlarges toward the edge section of the trumpet-shaped section 6032 (i.e., the edge section of the first opening 603), the outer contour of the trumpet-shaped section 6032 becomes large; when the configuration includes the crashed section 301 on the outer surface side of the trumpet-shaped section 6032, it easily interferes with members in the peripheral of the in-panel duct 600. Hence, it is favorable to include no crashed section 301 on the outer surface side of the trumpet-shaped section 6032 and to include the projection 300 on the inner surface side of the trumpet-shaped section 6032 in the configuration. However, in the present embodying mode, another member 700 is inserted via the opening diameter of trumpet-shaped section 6032 in the inner surface side of the first connecting section 6031 to connect another member 700 to the first connecting section 6031; hence, it is required that the projection 300 formed on the inner surface side of the trumpet-shaped section 6032 is configured in a contour not to hinder the insertion of another member 700.

The first opening 603 of the present embodying mode is disposed in the edge section of the body section of the in-panel duct 600 and is of the trumpet shape in which the opening diameter of the first opening 603 enlarges toward the edge section of the first opening 603, the crashed section 301 is formed continuously from the location of the body section of the in-panel duct 600 to the location of the start point of the trumpet shape, and the projection 300 is formed at the location of the trumpet shape. As a result, it is possible to enhance the welding strength of the parting lines PL of the first opening 603, to prevent cracks in the first opening 603.

Incidentally, in the first connecting section 6031 and the trumpet-shaped section 6032 of the present embodying mode, the opening diameter is almost of the rectangular shape; however, the opening diameter is not limited to almost the rectangular shape, but may be configured in an arbitrary contour of almost a trapezoid, an ellipse, or the like. In this situation, the outer shape of another member 700 to be connected to the first connecting section 6031 is configured in a shape corresponding to the opening diameter of the first connecting section 6031.

The second opening 604 includes, as shown in FIG. 17, the second connecting section 6041 and the trumpet-shaped section 6042. FIG. 17 shows a magnified configuration example of the second opening 604 shown in FIG. 13 in which (a) shows a configuration example viewed from direction C of the second opening 604 shown in FIG. 13 and (b) shows a configuration example viewed from direction D of the second opening 604 shown in FIG. 13.

The second connecting section 6041 is, like the first connecting section 4031 disposed in the first opening 603 described above, a female-type connecting section in which another member (not shown) is inserted in the inner surface side of the second connecting section 6041, for the connection of another member. The trumpet-shaped section 6042 is, like the trumpet-shaped section 6032 disposed in the first opening 603 described above, a section configured in a contour in which the opening diameter is enlarged when compared with the opening diameter of the second connecting section 6041. In the second opening 604, as in the first opening 603 described above, another member is inserted via the opening diameter of trumpet-shaped section 6042 in the inner surface side of the second connecting section 6041, to connect another member to the second connecting section 6041.

The second connecting section 6041 does not include, since another member is inserted in the inner surface side of the second connecting section 6041 for the connection of another member, the projection 300 on the inner surface side of the second connecting section 6031, and includes the crashed section 301 on the outer surface side of the second connecting section 6041; the crashed section 301 increases the welding area of the parting line PL of the second connecting section 6041, to enhance the welding strength.

Further, the trumpet-shaped section 6042 is configured in a contour in which the opening diameter is enlarged when compared with the opening diameter of the second connecting section 6041, and hence includes the projection 300 on the inner surface side of the trumpet-shaped section 6042; the projection 300 increases the welding area of the parting line PL of the trumpet-shaped section 6042, to enhance the welding strength. Incidentally, it is required that the projection 300 formed on the inner surface side of the trumpet-shaped section 6042 is configured in a contour not to hinder the insertion of another member.

The second opening 604 of the present embodying mode is disposed in the edge section of the body section of the in-panel duct 600 and is of the trumpet shape in which the opening diameter of the second opening 604 enlarges toward the edge section of the second opening 604, the crashed section 301 is formed continuously from the location of the body section of the in-panel duct 600 to the location of the start point of the trumpet shape, and the projection 300 is formed at the location of the trumpet shape. As a result, it is possible to enhance the welding strength of the parting lines PL of the second opening 604, to prevent cracks in the second opening 604.

Incidentally, in the second connecting section 6041 and the trumpet-shaped section 6042 of the present embodying mode, the opening diameter is almost of the circular shape; however, the opening diameter is not limited to almost the circular shape, but may be configured in an arbitrary contour of almost a trapezoid, an ellipse, or the like. In this situation, the outer shape of another member to be connected to the second connecting section 6041 is also configured in a shape corresponding to the opening diameter of the second connecting section 6041.

Further, in the in-panel duct 600 of the present embodying mode, the first opening 603 and the second opening 604 are configured to be different in the contour, but may also be configured in one and the same contour.

<Operation and Effects of In-Panel Duct 600 of Present Embodying Mode>

As above, in the in-panel duct 600 of the present embodying mode, the openings 603 and 604 include the connecting sections 6031 and 6041 to connect to the other members 700 and the trumpet-shaped sections 6032 and 6042 configured in a contour in which the opening diameter is enlarged when compared with the opening diameters of the connecting sections 6031 and 6041; and the connecting sections 6031 and 6041 are female-type connecting sections in which the other members 700 are inserted in the inner surface sides of the connecting sections 6031 and 6041 for the connection, include the crashed sections 301 on the outer surface sides of the connecting sections 6031 and 6041, to enhance the welding strength of the parting lines PL of the connecting sections 6031 and 6041, and further include the projections 300 on the inner surface sides of the trumpet-shaped sections 6032 and 6042 include, to enhance the welding strength of the parting lines PL of the trumpet-shaped sections 6032 and 6042. As a result, even with the openings 603 and 604 including the female-type connecting sections 6031 and 6041, it is possible to enhance the welding strength of the parting lines PL of the openings 603 and 604, to provide an in-panel duct 600 in which the openings 603 and 604 do not easily crack.

(Fourth Embodying Mode)

Next, description will be given of a fourth embodying mode.

Figure 18:
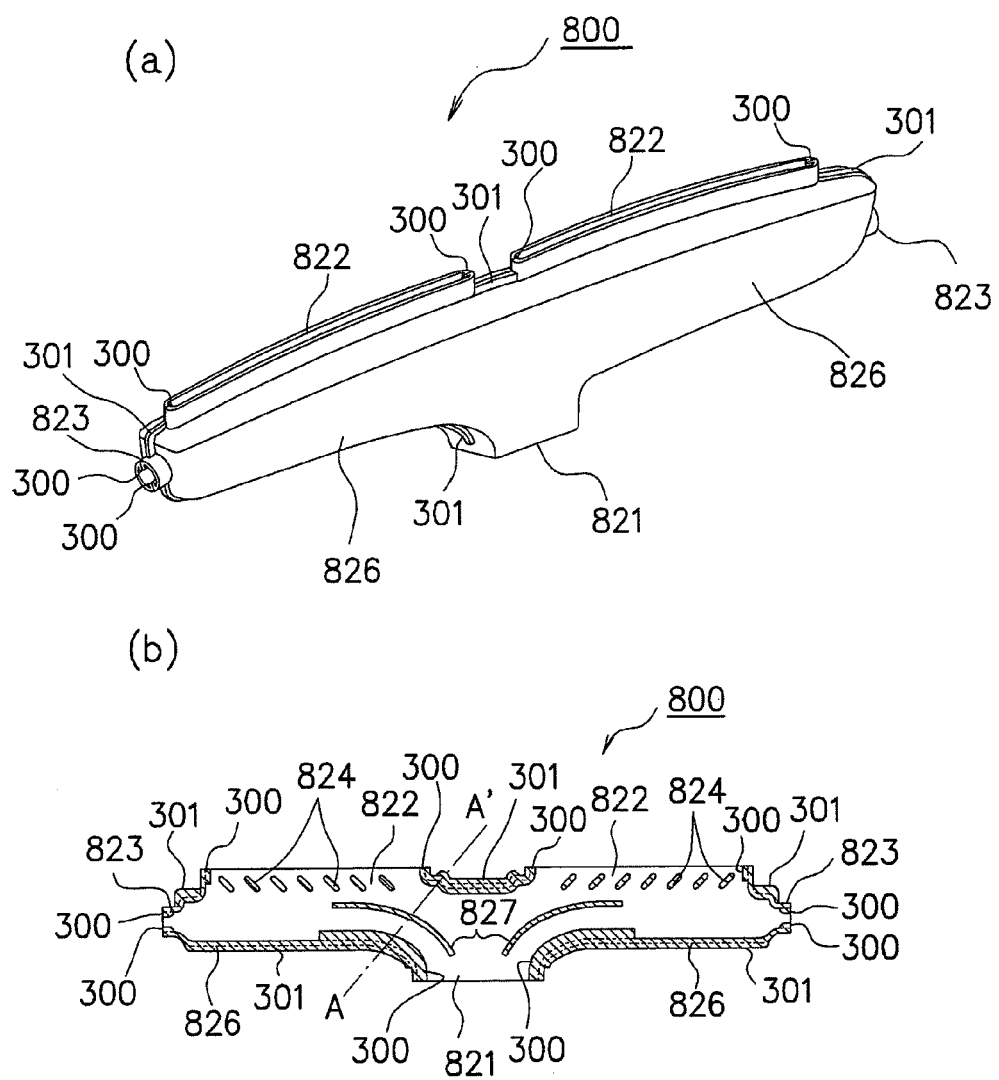
FIG. 18 is a diagram showing a configuration example of a defroster duct 800 of a fourth embodying mode.

The duct 800 of the fourth embodying mode includes, as shown in FIG. 19, a depression 803 on an inner surface of at least one wall section 801, 802 selected from the first wall section 801 and the second wall section 802, and in the depression 803, a fillet 824, 827 shown in FIG. 18, FIG. 19 is attached. Since the fillet 824, 827 is attached onto the depression 803, it is possible to mold a duct 800 which does not include pinholes and which includes the fillet 824, 827 on the inner surface of the duct 800. Incidentally, when the fillet 824, 827 is arranged on the inner surface of the duct 800, fluid flowing through the inner surface of the duct 800 is rectified by the fillet 824, 827; hence, load is imposed on the inner surface of the duct 800, and the parting lines PL easily crack in some cases. However, in the duct 800 of the present embodying mode, the projection 300 is formed on the inner surface side of the duct 800; hence, it is possible that the welding areas of the parting lines PL are increased and the welding strength is enhanced. As a result, it is possible to prevent occurrence of cracks in the parting lines PL due to the presence of the fillet 824, 827. Next, referring to the accompanying drawings, description will be given in detail of the duct 800 of the present embodying mode. However, in conjunction with the embodying mode below, description will be given of an example of a defroster duct 800 shown in FIG. 18 as one embodying mode of the duct 800.

<Configuration Example of Defroster Duct 800>

First, referring to FIG. 18, description will be given of a configuration example of the defroster duct 800 of the present embodying mode. FIG. 18 (*a*) is an external perspective view of the defroster duct 800 and FIG. 18 (*b*) is an internal configuration diagram of the defroster duct 800.

The defroster duct 800 of the present embodying mode is a defroster duct to guide defroster wind from an air-conditioning unit of a car to the front window and the side windows.

The defroster duct 800 of the present embodying mode includes an intake hole 821 to connect to an air-conditioning unit (not shown) disposed in a front corner of the passenger compartment of a car, a front defroster nozzle 822 to blow out defroster wind to the front window (not shown), and a side defroster guide hole 823 to guide defroster wind to the side windows (not shown).

The intake hole 821, the front defroster nozzle 822, and the side defroster guide hole 823 described above configure an opening of the defroster duct 800; hence, projections 300 are disposed on inner surfaces on the parting lines PL of the opening, which increases the welding areas of the parting lines PL of the opening, to enhance the welding strength. In addition, crashed sections 301 are disposed on outer surfaces on the parting lines PL of other than the opening described above, which increases the welding areas of the parting lines PL of other than the opening, to enhance the welding strength.

The front defroster nozzle 822 includes a pair of right and left units to blow out defroster wind on the right side and the left side of the front window, and second fillets 824 are disposed therein. The side defroster guide hole 823 includes a pair of right and left units to guide the defroster wind to the right and left side windows.

Duct sections 826 of the defroster duct 800 are shared between the front defroster and the side defroster, and first fillets 827 to determine the flow quantity distribution ratio for the front defroster and the side defroster are disposed in intermediate sections between the intake hole 821 and the duct sections 826.

In the defroster duct 800 of the present embodying mode, the first fillets 827 determine the flow quantity distribution ratio for the front defroster and the side defroster, and the defroster wind rectified by the second fillets 827 is blown out via the front defroster nozzles 822.

The defroster duct 800 of the present embodying mode includes the projections 300 on inner surfaces of the parting lines PL in the vicinity of the locations in which the fillets 824 and 827 are disposed; this increases the welding areas of the parting lines PL in the vicinity of the locations in which the fillets 824 and 827 are disposed, to enhance the welding strength. As a result, even when fluid flowing through the inner surface of the defroster duct 800 is rectified by the fillets 824, 827 and load is imposed on the inner surface of the defroster duct 800, since the projections 300 are formed on inner surface side of the defroster duct 800, the welding strength of the parting lines PL can be increased, to prevent occurrence of cracks in the parting lines PL.

The defroster duct 800 of the present embodying mode includes, as shown in FIG. 19, a first wall section 801 and a second wall section 802 welded via parting lines PL, and the first fillets 827 are attached onto inner surfaces of the first wall section 801 and the second wall section 802. FIG. 19 shows a cross-sectional configuration example of the defroster duct 800 cut off along A-A' of FIG. 18 (*b*) and shows a state in which the first fillets 827 are attached onto inner surfaces of the first wall section 801 and the second wall section 802. Incidentally, the second fillets 824, like the first fillets 827 shown in FIG. 19, are also attached onto inner surfaces of the first wall section 801 and the second wall section 802; in the present embodying mode, description will be given of an example of the first fillets 827.

The wall sections 801, 802 constituting the defroster duct 800 of the present embodying mode are configured using resin, and the fillets 824, 827 are configured using a material similar to that of the wall sections 801, 802. By configuring the fillets 824, 827 by use of a material similar to that of the wall sections 801, 802, it is possible that the fillets 824, 827 are easily welded onto the wall sections 801, 802 and it is also possible to prevent the fillets 824, 827 from removing from the wall sections 801, 802. However, the material constituting the fillets 824, 827 is not particularly restricted, but it is also possible to employ a material used for the known fillets. However, in consideration of the molding characteristic of the duct 800, the fillets 824, 827 are favorably configured using a material which makes it possible to easily weld the fillets 824, 827 onto inner surfaces of the wall sections 801, 802.

On the inner surfaces of the wall sections 801, 802 constituting the defroster duct 800 of the present embodying mode, depressions 803 are disposed as shown in FIG. 19, and the first fillet 827 is attached onto the depressions 803. Incidentally, at edge sections of the first fillet 827, an attaching section 900 is disposed to attach the first fillet 827 onto the depressions 803, and by attaching the attaching section 900 onto the depressions 803 by pushing it thereto, the first fillet 827 is attached onto the depressions 803. By disposing the attaching section 900 at the edge sections of the first fillet 827, and by attaching the attaching section 900 onto the depressions 803 by pushing it thereto, the first fillet 827 can be attached at an appropriate position. Incidentally, the first fillet 827 is attached by pushing the attaching section 900 onto the depressions 803 formed in the inner surfaces of the wall sections 801, 802; hence, thickness of the depressions 803 is less than thickness of the wall sections 801, 802 in which no depression 803 is formed.

Further, the upper surface 901 of the attaching section 900 attached onto the depressions 803 is placed in the same plane as for the inner surfaces of the wall sections 801, 802. As a result, it is possible to prevent the attaching section 900 of the first fillet 827 attached on the inner surfaces of the wall sections 801, 802 from hindering the flow path of fluid flowing through the inner surfaces of the defroster duct 800.

Incidentally, in FIG. 19, the first fillet 827 is attached onto the inner surfaces of the two wall sections 801, 802, i.e., the first wall section 801 and the second wall section 802. However, it is also possible that the first fillet 827 is attached onto the inner surface of at least one wall section selected from the first wall section 801 and the second wall section 802. However, since the first fillet 827 is attached on the inner surfaces of the two wall sections 801, 802, it is possible to prevent the first fillet 827 from removing from the wall sections 801, 802; further, it is possible to stabilize the first fillet 827 in the wall sections 801, 802.

For example, in the case of the configuration in which the first fillet 827 is attached on an inner surface of only one wall section 801, one of the edge sections of the first fillet 827 is not fixedly attached onto the inner surface of the wall section; hence, the first fillet 827 swings due to the fluid flowing through the inside of the duct, and stability of the first fillet 827 is deteriorated. In contrast, in the case of the configuration in which the first fillet 827 is attached onto the inner surfaces of the two wall sections 801, 802, both ends of the first fillet 827 are fixedly attached onto the inner surfaces of the two wall sections 801, 802; hence, it is possible to prevent the first fillet 827 from swinging due to the fluid flowing through the inside of the duct, to thereby stabilize the first fillet 827. Hence, it is favorable that the first fillet 827 is attached onto the inner surfaces of the two wall sections 801, 802. Incidentally, it is also possible that one edge section of the first fillet 827 is attached onto the inner surface of one wall section and the other edge section of the first fillet 827 is attached onto the inner surface of the other wall section in the configuration. Also in this situation, it is possible to obtain an advantage similar to that of the configuration in which the first fillet 827 is attached onto the inner surfaces of the two wall sections 801, 802.

Further, in FIG. 19, the first fillet 827 is attached such that the upper surface 901 of the attaching section 900 attached onto the depressions 803 is placed in the same plane as for the inner surfaces of the wall sections 801, 802. However, as shown in FIG. 20 (a), it is also possible that the attaching section 900 attached onto the depression 803 is buried in the wall sections 801, 802 and at least part of the upper surface 901 of the attaching section 900 is coated with the resin constituting the wall sections 801, 802. For example, the attaching section 900 of the first fillet 827 is pushed against the resin constituting the wall sections 801, 802 to swell part of the resin toward the duct inner side as compared with the upper surface 901 of the attaching section 900, and then the blowing pressure is applied into the duct; as a result, it is possible to coat part of the upper surface 901 of the attaching section 900 with the resin. This makes it possible to securely prevent the first fillet 827 from removing from the wall sections 801, 802. Incidentally, in FIG. 20 (a), the attaching section 900 is of the contour of substantially a rectangle; however, the contour of the attaching section 900 is not particularly restricted, only if it is possible, when the first fillet 827 is attached onto the inner surfaces of the wall sections 801, 802, to coat the attaching section 900 with the resin constituting the wall sections 801, 802, any contour is applicable; for example, the contour of a trapezoid, a triangle, or the like may be employed in the configuration. Further, as shown in FIG. 20 (a), it is also possible that notches or holes are disposed in the attaching section 900 such that when the attaching section 900 is pushed against the resin constituting the wall surfaces, the resin enters the notches or the holes. This makes it possible to strengthen the attaching of the first fillet 827.

In this regard, when attaching the attaching section 900 of the first fillet 827 onto the depressions 803, it is required that no gap takes place between the attaching section 900 and the depressions 803. This is because there may appear a situation in which when the gap takes place, the attaching strength between the attaching section 900 and the depressions 803 is lowered and the flow path of the fluid on the inner surfaces of the defroster 800 is affected. Hence, it is favorable that the contour of the attaching section 900 is substantially equal in size to the contour of the depressions 803 in the configuration. By configuring the contour of the attaching section 900 and that of the depressions 803 to be substantially equal in size, it is possible to prevent occurrence of the gap when the attaching section 900 is attached onto the depressions 803. Further, it is also possible to configure the contour of the attaching section 900 to be larger in size than the contour of the depressions 803. By configuring the contour of the attaching section 900 to be larger in size than the contour of the depressions 803, it is possible that when the attaching section 900 is attached onto the depressions 803, the resin constituting the depressions 803 flows into the periphery of the attaching section 900 and the periphery of the attaching section 900 is coated with the resin. Incidentally, when the attaching section 900 is attached onto the depressions 803 not to cause the gaps, air may remain between the attaching section 900 and the depressions 803 depending on cases. Hence, it is favorable that the attaching section 900 is configured in a contour in which when the attaching section 900 is attached onto the depressions 803, air remaining between the attaching section 900 and the depressions 803 is exhausted to the outside.

For example, in FIGS. 19 and 20, the planes of the sections in which the attaching section 900 makes contact with the depressions 803 are of the contour of a straight line shape; but, it may be of a curved line shape. In the situation of the straight line shape, when the attaching section 900 is attached onto the depressions 803, the overall planes simultaneously make contact therewith, and there occurs a situation in which air remains therebetween; however, in the situation of the curved line shape, it does not occur that the overall planes simultaneously make contact therewith, but sequentially make contact therewith; hence, it is possible to secure a place through which air flows outside. This makes it possible to prevent air from remaining therebetween. Further, by disposing a hole as shown in FIG. 20 (*b*), it is possible to exhaust air via the hole; hence, it is possible to prevent air from remaining therebetween.

Also, in the embodying mode described above, the depressions 803 are formed, as shown in FIGS. 19 (*b*) and 20 (*a*), on the inner surfaces of the wall sections 801, 802, and the first fillet 827 is attached by pushing the attaching section 900 onto the depressions 803. However, as shown in FIG. 20 (*c*), it is also possible to attach the first fillet 827 by pushing the attaching section 900 onto the inner surfaces of the wall sections 801, 802. Also in this situation, it is also possible to conduct the attaching by pushing the attaching section 900 such that the upper surface 901 of the attaching section 900 is placed in the same plane as for the inner surfaces of the wall sections 801, 802.

In the defroster duct 800 of the present embodying mode, the first fillet 827 is attached onto the inner surfaces of the wall sections 801, 802, and the first fillet 827 rectifies the fluid flowing through the inner surfaces of the defroster duct 800. Hence, load is imposed on the inner surfaces of the defroster duct 800 due to the fluid rectified by first fillet 827, and the parting lines PL easily cracks in some cases. Hence, the projections 300 are formed on the inner surface side of the parting lines PL of the defroster duct 800 and the crashed sections 301 are formed on the outer surface side of the parting lines PL. This makes it possible that the welding areas of the parting lines PL are increased and the welding strength is enhanced. As a result, it is possible to prevent occurrence of cracks in the parting lines PL due to presence of the first fillet 827. Incidentally, the present embodying mode shows a configuration example in which both of the projections 300 and the crashed section 301 are formed; however, it is also possible to form at least either the projections 300 or the crashed sections 301. For example, at a location where it is not desired to hinder the flow path of the fluid flowing through the inner surfaces of the defroster duct 800, it is favorable that no projection 300 is formed and the crashed section 301 is formed. Further, at a location where it is desired to avoid interferences between the defroster duct 800 and members in the periphery of the defroster duct 800, it is favorable that no crashed section 301 is formed and the projection 300 is formed. Hence, according to the situation in which it is not desired to hinder the flow path of the fluid and/or the situation in which it is desired to avoid interferences with members in the periphery of the defroster duct 800, it is favorable to form at least either the crashed sections 301 or the projections 300.

<Defroster Duct 800 Molding Method Example>

Next, referring to FIGS. 4 and 5 and FIGS. 21 to 24, description will be given of a molding method example of the defroster duct 800 of the present embodying mode.

First, as shown in FIG. 4, the thermoplastic resin sheets P are extruded from the T die 28, and the extruded thermoplastic resin sheets P are fed through a pair of rollers 30 to adjust thickness of the thermoplastic resin sheets P and then are suspended between a pair of split molds 32.

As shown in FIG. 4, after the two sheets of thermoplastic resin P are arranged between the split molds 32, the molding flasks 33 of the split molds 32 are moved, as shown in FIG. 5, toward the sheets of thermoplastic resin P, to bring the molding flasks 33 existing on the outer circumferences of the split molds 32 into contact with side surfaces of the sheets of thermoplastic resin P. As a result, a sealed space is formed by the sheets of thermoplastic resin P, the molding flasks 33, and the cavities 116.

Figure 21:
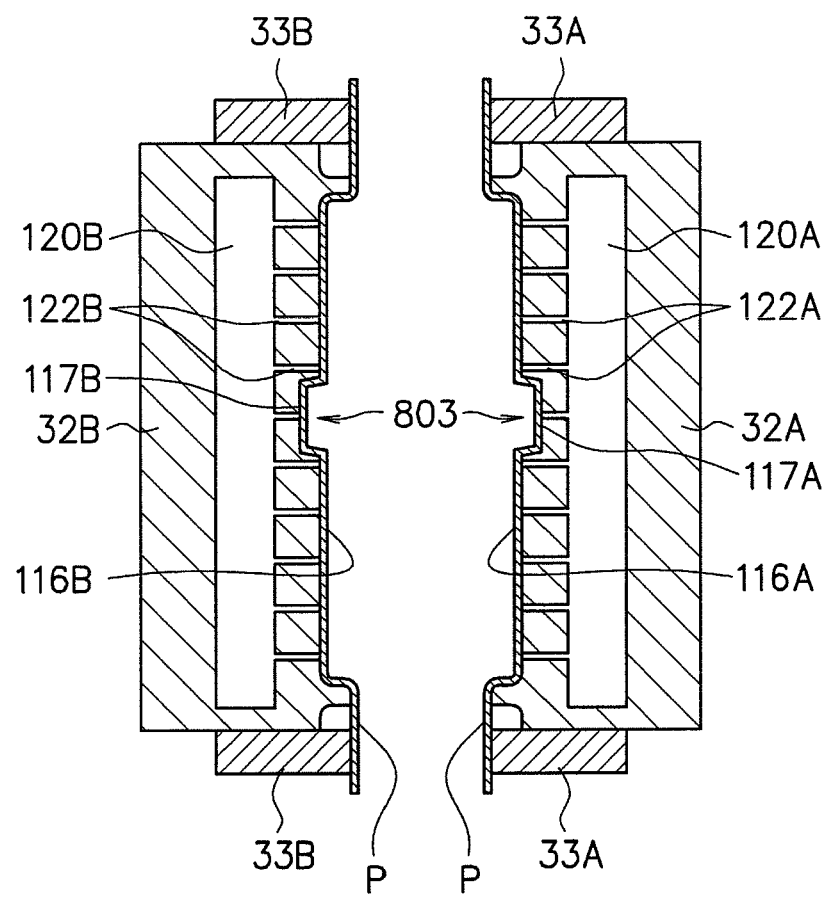
FIG. 21 is a diagram showing a molding method example of the defroster duct 800 of the present embodying mode and is a diagram showing a state in which the thermoplastic resin sheets P are vacuum-sucked onto the cavities 116 of the split molds 32.

Next, as shown in FIG. 21, the air in the sealed space is sucked via sucking holes 122 by vacuum sucking rooms 120 to adsorb the sheets of thermoplastic resin P onto the cavities 116, to form the sheets of thermoplastic resin P in the contours of the surfaces of the cavities 116. Since the cavities 116 of the present embodying mode include the depressions 117, by forming the sheets of thermoplastic resin P in the contours of the surfaces of the cavities 116, the depressions 803 having the contours corresponding to the depressions 117 of the cavities 116 can be formed on the sheets of thermoplastic resin P.

Further, in the present embodying mode, the sheets of thermoplastic resin P before the suction are uniform in thickness in the upper and lower directions; hence, it is possible to prevent an even in which due to the distribution of thickness caused by the blowing ratio, the forming process is not satisfactorily performed.

Figure 22:
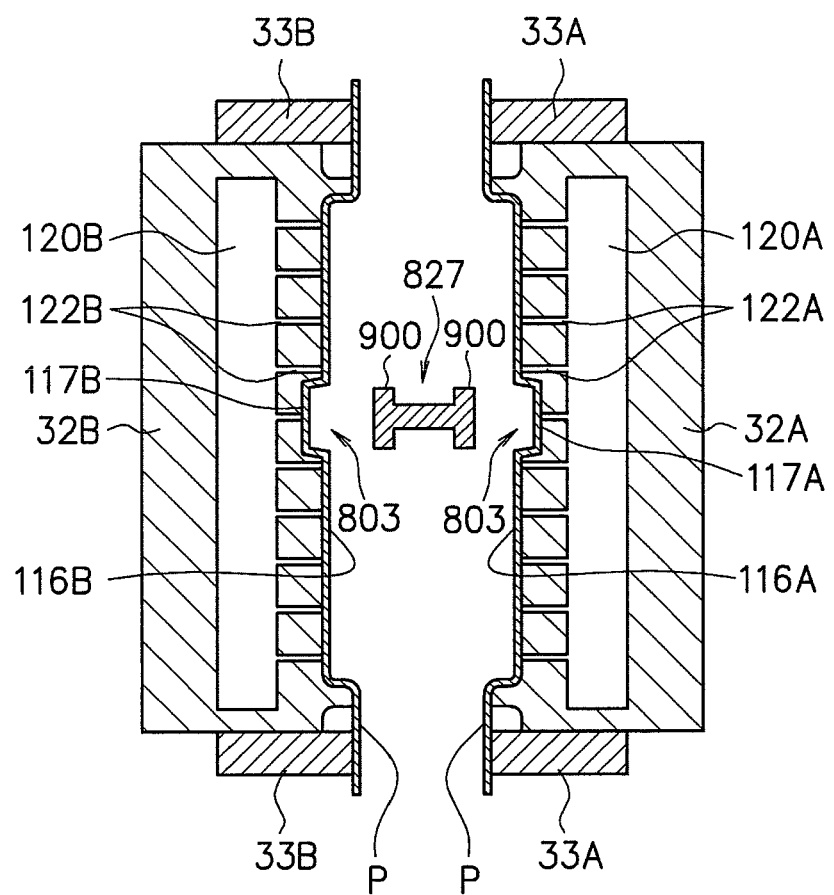
FIG. 22 is a diagram showing a state in which the fillet 827 is inserted between the thermoplastic resin sheets P.

Next, as shown in FIG. 22, the first fillet 827 is inserted in the inside of the sheets of thermoplastic resin P by a fillet attaching device (not shown), and the attaching sections 900 disposed at edge sections of the first fillet 827 are pushed to be attached onto the depressions 803 formed in the sheets of thermoplastic resin P. As a result, the first fillet 827 can be attached onto the sheets of thermoplastic resin P.

Figure 23:
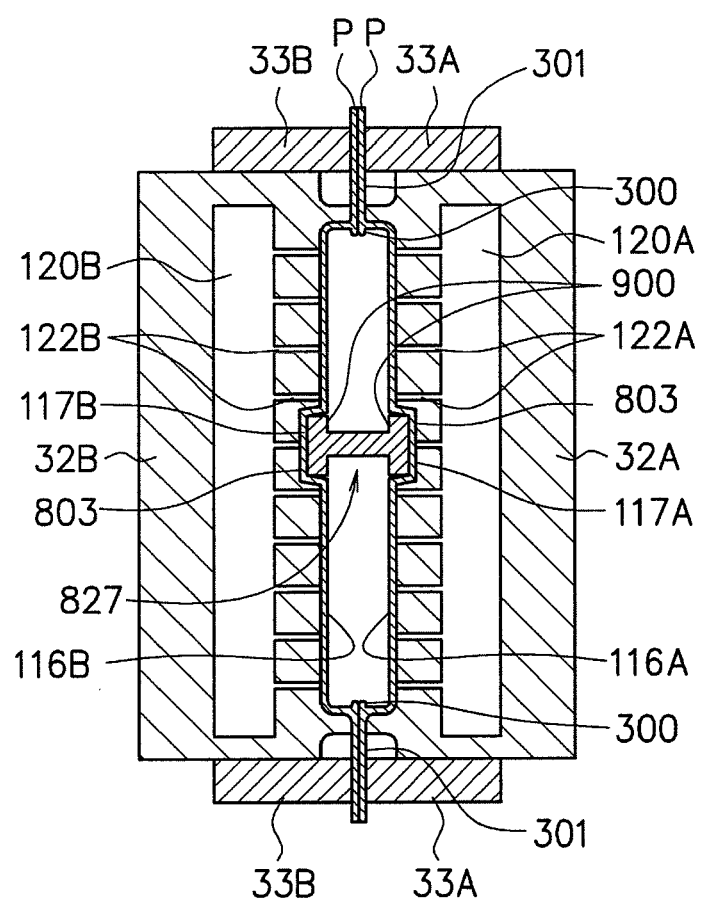
FIG. 23 is a diagram showing a state in which the split molds 32 are clamped.

Next, as shown in FIG. 23, the molding flasks 33 and the split molds 32 are moved as one unit to approach each other, to thereby clamp the split molds 32 such that the circumferential edge sections of the sheets of thermoplastic resin P are welded onto each other by the pinch-off sections 118 of the split molds 32. As a result, the projections 300 are formed on the inner surface side of the defroster duct 800, and the crashed sections 301 are formed on the outer surface side of the defroster duct 800.

Incidentally, as in the present embodying mode, when attaching both edges of the first fillet 827 onto the sheets of thermoplastic resin P, after the first fillet 827 is inserted in the inside of the sheets of thermoplastic resin P by the fillet attaching device, the attaching section 900 disposed at one edge section of the first fillet 827 is pushed to be attached onto the depression 803 of one sheet of thermoplastic resin P, and when clamping the split molds 32, the attaching section 900 disposed at the other edge section of the first fillet 827 is pushed to be attached onto the depression 803 of the other sheet of thermoplastic resin P. As a result, both edges of the first fillet 827 can be attached onto the sheets of thermoplastic resin P. Incidentally, in the present embodying mode, since the first fillet 827 is pushed to be attached onto the depressions 803, thickness of the sheets of thermoplastic resin P in the sections in which the depressions 803 are formed is less than thickness of the sheets of thermoplastic resin P in the sections in which the depressions 803 are not formed.

Figure 24:
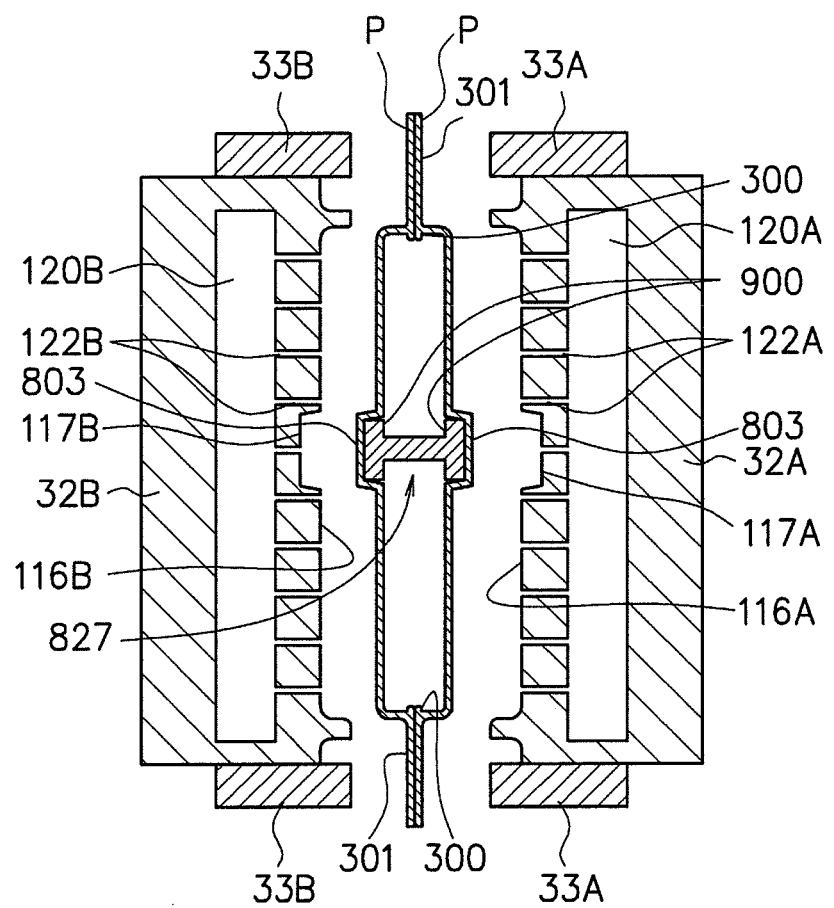
FIG. 24 is a diagram showing a state in which the split molds 32 are unclamped.

Next, as shown in FIG. 24, the molding flasks 33 and the split molds 32 are moved as one unit to be apart from each other to thereby unclamp the split molds 32, and the molded resin molded product is taken out and then burrs of the outer circumferential sections are removed. This completes the defroster duct 800 shown in FIG. 18.

<Operation and Effects of Defroster Duct 800 of Present Embodying Mode>

As above, in the defroster duct 800 of present embodying mode, two sheets of thermoplastic resin P in the melted state are arranged between the split molds 32. Next, the sheets of thermoplastic resin P are sucked onto the split molds 32, to form the depressions 803 in the sheets of thermoplastic resin P. Next, the attaching sections 900 are attached onto the depressions 803 formed in the sheets of thermoplastic resin P, and the first fillet 827 is pushed to be attached onto the sheets of thermoplastic resin P. Next, the split molds 32 are clamped to form the sheets of thermoplastic resin P in the contours according to the split mold contours, to thereby form a defroster duct 800 including the first fillet 827 and the projections 300 on the duct inner surface and the crashed sections 301 on the duct outer surface. As a result, it is possible to mold a defroster duct 800 in which the first fillet 827 is attached onto the depressions 803 on the inner surface of at least one of the wall sections 801, 802 and which includes the projections 300 on the duct inner surface onto which the first fillet 827 is attached and the crashed sections 301 on the duct outer surface. Further, in the defroster duct of present embodying mode, since the fillet 827 is attached onto the depressions 803, it is possible to mold a defroster duct 800 which does not include pinholes and which includes the fillet 827 on the inner surface of the defroster duct 800.

Incidentally, the defroster duct 800 of present embodying mode is favorably molded by the sheet direct molding described above. In the parison blow molding, since it is required to arrange fillets on the inner surface of the parison without edges, it is difficult to arrange a plurality of fillets on the inner surface of the parison; particularly, it is quite difficult to arrange a plurality of fillets in the parison extruding direction. Further, areas in which the fillets are arranged on the inner surface of the parison are restricted.

In contrast, in the sheet direct molding, since the fillets 824, 827 are arranged on the inner surfaces of the sheets of thermoplastic resin P with edges, a plurality of fillets 824, 827 can be easily arranged on the inner surfaces of the sheets of thermoplastic resin P, and a plurality of fillets 824, 827 can be easily arranged also in the extruding direction of the sheets of thermoplastic resin P.

Further, the fillets 824, 827 can be freely arranged on any inner surfaces of the sheets of thermoplastic resin P; hence, for example, like the floor duct 800 shown in FIG. 18, it is possible to easily mold a floor duct 800 including a plurality of fillets 824, 827. That is, by using the sheet direct molding, it is possible to easily mold a floor duct 800 including a plurality of fillets 824, 827 in the extruding direction of the sheets of thermoplastic resin P.

Moreover, in the present embodying mode, by use of the depression 117 formed in the cavities 116 of the split molds 32, the depression 803 are formed in the sheets of thermoplastic resin P, and the fillets 824, 827 are pushed to be attached onto the depression 803; hence, it is possible to easily attach the fillets 824, 827 onto the sheets of thermoplastic resin P, and the attaching precision of the fillets 824, 827 can be increased.

Incidentally, the embodying modes described above are favorable embodying modes of the present invention, and the scope of the present invention is not limited only to these embodying modes, but various changes may be made therein without departing from the gist of the present invention.

For example, for the in-panel duct 200 of the second embodying mode, description has been given on the assumption that it includes, as shown in FIGS. 11 and 12, the projections 300 on the inner surface of the connecting section 204'. However, there may be employed a mode of the configuration which includes no projection 300 on the inner surface of the connecting section 204' and which includes the crashed sections 301 only on the outer surface of the connecting section 204'.

By using the configuration including the crashed sections 301 on the outer surface side of the connecting section 204', it is possible to enhance the welding strength of the connecting section 204' disposed in the opening 204. As a result, it is possible to prevent cracks from easily taking place beginning at edge sections of the in-panel duct 200. Further, since the crashed sections 301 are formed on the outer surface side of the connecting section 204' in the configuration, it is possible to prevent an event in which other members to be connected to the connecting section 204' are erroneously attached. Incidentally, the in-panel duct 200 of the second embodying mode described above makes it possible to configure a duct 200 in a mode described in the additions below.

(Addition 1)

A resin duct 200 comprising a first wall section 201 and a second wall section 202 welded via parting lines PL, characterized in that:

openings 204 to 207 of the duct 200 comprise connecting sections 204' to 207' to connect to other members 500, and the connecting sections 204' to 207' are male-type connecting sections 204' to 207' which are inserted in inner surface sides of the other members 500 for connection; and a mean thickness of the entire duct 200 is 1 mm or less, and the duct comprises crashed sections 301' formed by crashing resin, on outer surface sides of the connecting sections 204' to 207'.

(Addition 2)

A resin duct 200 in accordance with addition 1, characterized in that:

thickness of the crashed sections 301' is 1.0 to 1.8 times as large as mean thickness in a predetermined cross section of the duct 200; and projection length of the crashed sections 301' projected on the outer surface sides relative to an inner surface of the duct 200 is 2.0 or more times as large as the mean thickness in the predetermined cross section of the duct 200.

(Addition 3)

A resin duct 200 in accordance with addition 1 or 2, characterized in that the crashed sections 301' are disposed at least at two locations in one connecting section 204', and contours of the respective crashed sections 301' are different from each other.

(Addition 4)

A resin duct 200 in accordance with one of additions 1 to 3, characterized in that the crashed sections 301' are disposed in the respective connecting section 204' to 207', and contours of the crashed sections 301' disposed in the respective connecting section 204' to 207' are different from each other.

(Addition 5)

A resin duct 500 comprising female-type connecting sections 501 to connect to the male-type connecting sections 204' to 207' of the duct 200 in accordance with one of additions 1 to 4, characterized in that:

the female-type connecting sections 501 are of a contour in which the male-type connecting sections 204' to 207' comprising crashed sections 301' are insertable, and the duct 500 comprises, at positions of the crashed sections 301 formed in the male-type connecting section 204' to 207' inserted in the female-type connecting sections 501, groove sections 502 of a contour corresponding to the contour of the crashed sections 301.

(Addition 6)

A duct 200 in accordance with addition 5, characterized by comprising crashed sections 503 formed by crashing resin, on outer surface sides of the groove sections 502.

Further, the defroster duct 800 of the fourth embodying mode has been described on assumption that it includes the crashed sections 301 and the projections 300 in the periphery of the parting lines PL of the defroster duct 800. However, it may also be configured in a mode in which it does not include the crashed sections 31 and the projections 300, and the fillets 827 are attached onto the depressions 803. Since the fillets 827 are attached onto the depressions 803, it is possible to mold a defroster duct 800 which does not include the pinholes and which includes the fillets 827 on the inner surfaces of the defroster duct 800. Incidentally, the defroster duct 800 of the fourth embodying mode described above makes it possible to configure a duct 200 in a molding method similar in the modes described in the additions below.

(Addition 1)

A molding method of a duct 800, characterized by comprising:

an arranging step of arranging two sheets of resin P in a melted state between molds 32;

a sucking step of sucking the resin sheets P onto the molds 32;

a pushing step of pushing fillets 827 onto the sucked resin sheets P; and a clamping step of clamping the molds 32 to form the resin sheets P in a contour along a contour of the molds 32, to thereby mold a duct 800 comprising fillets 827 on inner surfaces of the duct 800.

(Addition 2)

A molding method of a duct 800 in accordance with addition 1, characterized in that:

the molds 32 comprise depressions 117 at locations to make contact with the resin sheets P;

the sucking step comprises sucking the resin sheets P onto the molds 32, to thereby form depressions 803 in a contour corresponding to the depressions 117 of the molds 32, in the resin sheets P; and the pushing step comprises pushing the fillets 827 onto the depressions 803 formed in the resin sheets P.

(Addition 3)

A resin duct 800 comprising a first wall section 801 and a second wall section 802 welded via parting lines PL, characterized by comprising depressions 803 in inner surfaces of at least one of the wall sections 801, 802, and fillets 827 are attached onto the depressions 803.

(Addition 4)

A duct 800 in accordance with addition 3, characterized by comprising projections of a contour corresponding to a contour of the depressions 803, on outer surfaces of the wall sections 801, 802 at positions corresponding to the depressions 803.

(Addition 5)

A duct 800 in accordance with addition 3 or 4, characterized by comprising attaching sections 900 at edge sections of the fillets 827 to attach the fillets 827 onto the depressions 803, and upper surfaces 901 of the attaching sections 900 attached onto the depressions 803 are placed on the same plane as for the inner surfaces of the wall sections 801, 802.

(Addition 6)

A duct 800 in accordance with addition 3 or 4, characterized by comprising attaching sections 900 at edge sections of the fillets 827 to attach the fillets 827 onto the depressions 803, the attaching sections 900 attached onto the depressions 803 are buried in the wall sections 801, 802 and at least part of upper surfaces 901 of the attaching sections 900 are coated with resin.

DESCRIPTION OF REFERENCE NUMERALS

P Sheet of thermoplastic resin
200, 600 In-panel duct
201, 601 First wall section
202, 602 Second wall section
204-210 Opening
204'-207' Connecting section (male type)
300 Projection
301, 301' Crashed section
400, 500, 700 Other member (female type)
603 First opening
6031 First connecting section
6032 Trumpet-shaped section
604 Second opening
6041 Second connecting section
6042 Trumpet-shaped section
PL Parting line
800 Defroster duct
801 First wall section
802 Second wall section
803 Depression
824 Second fillet
827 First fillet

The invention claimed is:

1. A resin duct, comprising:
   a first wall section and a second wall section welded via parting lines, wherein:
   a mean thickness of the entire duct is 1 mm or less, and the duct comprises projections formed by projecting the resin on inner surface sides of the duct on the parting lines; and
   wherein the duct includes an opening, and
   wherein the opening includes a connecting section to connect to an other member and a trumpet-shaped section having a diameter larger than the connecting section;
   wherein the connecting section is female-type and configured to receive the other member so that the other member is inserted into the opening and connected to the connecting section, and
   wherein the projections are formed at least on an inner surface side of the trumpet-shaped section.

2. The resin duct in accordance with claim 1, wherein a thickness B in a predetermined cross section of the duct, and a thickness A defined by a distance from an outermost surface of the duct at the parting line in which projections are formed to an innermost surface of the projections, satisfy the relationship: $A \leq 2.0\ B$.

3. The resin duct in accordance with claim 1, further comprising:
   crashed sections formed by crashing the resin on outer surface sides of the duct on the parting lines, wherein:
   the crashed sections are formed at least on outer surface sides of the connecting sections, and
   the crashed sections are continuously formed from a location of the body section of the duct to a location at which the trumpet-shaped contour begins.

4. The resin duct in accordance with claim 1, wherein the parting lines are formed in an entire circumference of the duct.

5. The resin duct in accordance with claim 2, wherein the thickness B and the thickness A satisfy the relationship: $1.2\ B \leq A \leq 1.8\ B$.

* * * * *